US012771848B2

(12) United States Patent
Yu et al.

(10) Patent No.: US 12,771,848 B2
(45) Date of Patent: Oct. 20, 2026

(54) ENCODING METHOD, DECODING METHOD, BITSTREAM, ENCODER, DECODER, STORAGE MEDIUM, AND SYSTEM

(71) Applicants: ZHEJIANG UNIVERSITY, Hangzhou (CN); GUANGDONG OPPO MOBILE TELECOMMUNICATIONS CORP., LTD., Dongguan (CN)

(72) Inventors: Lu Yu, Dongguan (CN); Chao Wang, Dongguan (CN); Dong Wang, Dongguan (CN)

(73) Assignee: GUANGDONG OPPO MOBILE TELECOMMUNICATIONS CORP., LTD., Dongguan (CN)

(*) Notice: Subject to any disclaimer, the term of this patent is extended or adjusted under 35 U.S.C. 154(b) by 197 days.

(21) Appl. No.: 18/618,752

(22) Filed: Mar. 27, 2024

(65) Prior Publication Data

US 2024/0244218 A1 Jul. 18, 2024

Related U.S. Application Data

(63) Continuation of application No. PCT/CN2021/122480, filed on Sep. 30, 2021.

(51) Int. Cl.

| | |
|---|---|
| ***H04N 19/136*** | (2014.01) |
| ***G06V 10/25*** | (2022.01) |
| ***G06V 10/77*** | (2022.01) |
| ***G06V 10/774*** | (2022.01) |
| ***G06V 10/82*** | (2022.01) |
| ***H04N 19/167*** | (2014.01) |

(Continued)

(52) U.S. Cl.

CPC ........... *H04N 19/136* (2014.11); *G06V 10/25* (2022.01); *G06V 10/7715* (2022.01); *G06V 10/774* (2022.01); *G06V 10/82* (2022.01); *H04N 19/167* (2014.11); *H04N 19/172* (2014.11); *H04N 19/70* (2014.11)

(58) Field of Classification Search

CPC ...................................................... G06V 10/25

See application file for complete search history.

(56) References Cited

U.S. PATENT DOCUMENTS

| | | | |
|---|---|---|---|
| 10,129,528 | B2 | 11/2018 | Bonefas |
| 2016/0301947 | A1 | 10/2016 | Chen |

(Continued)

FOREIGN PATENT DOCUMENTS

| | | | |
|---|---|---|---|
| CN | 104717512 | A | 6/2015 |
| CN | 109862315 | A | 6/2019 |

(Continued)

OTHER PUBLICATIONS

Supplementary European Search Report in the European application No. 21959005.6, mailed on Jul. 2, 2025.

(Continued)

*Primary Examiner* — Jerry T Jean Baptiste
(74) *Attorney, Agent, or Firm* — BAYES PLLC

(57) ABSTRACT

An encoding method, a decoding method and a decoder are provided. The method includes that: a bitstream is parsed to determine reconstructed feature data; and feature analysis is performed on the reconstructed feature data by using an intelligent task network to determine a target result.

20 Claims, 24 Drawing Sheets

(51) Int. Cl.
*H04N 19/172* (2014.01)
*H04N 19/70* (2014.01)

(56) References Cited

U.S. PATENT DOCUMENTS

| | | | | |
|---|---|---|---|---|
| 2017/0042089 | A1 | 2/2017 | Bonefas | |
| 2021/0276595 | A1 | 9/2021 | Casas et al. | |
| 2022/0210435 | A1* | 6/2022 | Kang | H04N 19/196 |
| 2023/0224502 | A1* | 7/2023 | Damghanian | H04N 21/4348 375/240.26 |

FOREIGN PATENT DOCUMENTS

| | | | |
|---|---|---|---|
| CN | 111325252 | A | 6/2020 |
| CN | 112866697 | A | 5/2021 |
| CN | 113240115 | A | 8/2021 |
| EP | 3315006 | A1 | 5/2018 |
| EP | 3828592 | A1 | 6/2021 |
| WO | 2022098727 | A1 | 5/2022 |

OTHER PUBLICATIONS

International Search Report in the international application No. PCT/CN2021/122480, mailed on Jun. 23, 2022. 5 pages with English translation.

Written Opinion of the International Search Authority in the international application No. PCT/CN2021/122480, mailed on Jun. 23, 2022. 6 pages with English translation.

* cited by examiner

FIG. 2
Decoded Data
A1
Feature Data
A2
Target Result

FIG. 7
Input picture data
A1
Feature data
E2
Bitsream
D2
Reconstruction feature data
A2
Target result

ENCODING METHOD, DECODING METHOD, BITSTREAM, ENCODER, DECODER, STORAGE MEDIUM, AND SYSTEM

CROSS-REFERENCE TO RELATED APPLICATION

This is a continuation application of International Patent Application No. PCT/CN2021/122480, filed on Sep. 30, 2021, the content of which is hereby incorporated by reference in its entirety.

BACKGROUND

At present, the encoding and decoding process for the picture and video may include the traditional method and the intelligent method based on the neural network. The traditional method is to perform the process of redundancy elimination for the input data. For example, the encoding and decoding processing for the picture or video is to perform the redundancy elimination by using the spatial correlation of each picture and the temporal correlation between multiple pictures. The intelligent method is to use neural network to perform the picture information process and extract the feature data.

In related arts, the decoded data obtained through the encoding and decoding process is generally directly used as the input data of the intelligent task network. However, the decoded data may include a large amount of redundant information that are not needed by the intelligent task network, and the transmission of these redundant information will lead to the waste of bandwidth or the decrease of the efficiency of the intelligent task network. In addition, there is almost no correlation between the end-to-end encoding and decoding process and the intelligent task network, such that the encoding and decoding process is unable to optimize the intelligent task network.

SUMMARY

The embodiments of the present disclosure relate to the technical field of intelligent coding, in particular to an encoding and decoding method, a bitstream, an encoder, a decoder, a storage medium and a system.

The embodiments of the present disclosure provide an encoding method and a decoding method, a bitstream, an encoder, a decoder, a storage medium and a system.

The technical solution of the embodiments of the disclosure may be implemented as follows.

In a first aspect, the embodiments of the present application provide a decoding method, the method includes that:

- a bitstream is parsed to determine a reconstruction feature data; and
- a feature analysis is performed on the reconstruction feature data by using an intelligent task network to determine a target result.

In a second aspect, the embodiments of the present application provide an encoding method, the method includes that:

- a feature extraction for input picture data is performed by using an intelligent task network to obtain initial feature data;
- a encoding process for the initial feature data is performed by using an encoding network, and obtained encoded bits are signalled in a bitstream.

In a third aspect, the embodiments of the present disclosure provide a decoder, the decoder includes: a second memory and a second processor.

The second memory is configured to store a computer program capable of running on the second processor.

The second processor is configured to, when running the computer program: parse a bitstream to determine a reconstruction feature data; and perform a feature analysis on the reconstruction feature data by using an intelligent task network to determine a target result.

DETAILED DESCRIPTION

Figure 1:
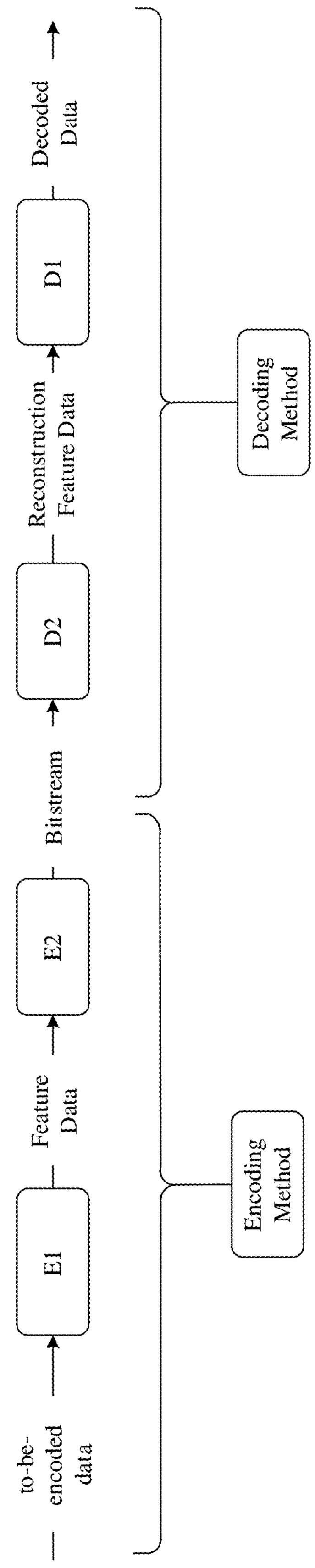
FIG. 1 is a schematic diagram of the overall framework of an encoding and decoding system.

In order to enable a more detailed understanding of the features and technical content of the embodiments of the present disclosure, the implementation of the embodiments of the present disclosure will be described in detail below in conjunction with the accompanying drawings, which are provided for illustration only and are not intended to limit the embodiments of the present disclosure.

Unless otherwise defined, all technical and scientific terms used herein have the same meanings as are commonly understood by those skilled in the art of the present disclosure. Terms used herein are for the purpose of describing the embodiments of the disclosure only and are not intended to limit the present disclosure.

In the following description, reference is made to "some embodiments" that describe a subset of all possible embodiments. However, it is to be understood that "some embodiments" may be the same subset or different subsets of all possible embodiments and may be combined with each other without conflict. It is further to be pointed out that, the terms "first/second/third" referred in embodiments of the present disclosure are merely used to distinguish similar objects, and do not represent a particular order for the objects. It is to be understood that "first/second/third" may be interchanged in a particular order or sequence where allowed, such that the embodiments of the disclosure described herein may be implemented in an order other than that illustrated or described herein.

Presently, the encoding and decoding process for the picture and video may include the traditional method and the intelligent method for processing based on the neural network. The traditional method is to perform the process of redundancy elimination for input data. For example, the encoding and decoding process for the picture or video is to perform the redundancy elimination by using the spatial correlation of each picture and the temporal correlation between multiple pictures. The intelligent method is to use neural network to perform the picture information process and extract the feature data.

In a particular embodiment, for pictures, the picture-based encoding and decoding processing may be categorized into traditional method and neural network-based intelligent method. The traditional method uses the spatial correlation of pixels to perform the process of redundancy elimination for the picture, and obtains the bitstream through transformation, quantization and entropy coding and transmits the bitstream. The intelligent method is to use the neural network to perform the encoding and decoding process. At present, the neural network-based picture encoding and decoding method has introduced many efficient neural network structures, which can be used for the feature information extraction of the picture. Herein, Convolutional Neural Networks (CNN) is the earliest network structure used for picture encoding and decoding. On the basis of CNN, many improved neural network structures as well as probability estimation models are derived. Taking the neural network structure as an example, it may include the network structure, such as Generative Adversarial Network (GAN) and Recurrent Neural Network (RNN), which can improve the neural network-based end-to-end picture compression performance. The GAN-based picture encoding and decoding method has achieved significant result in improving the subjective quality of picture.

In another specific embodiment, for the video, the video-based encoding and decoding processing may also be categorized into the traditional method and neural network-based intelligent method. The traditional method is to perform the encoding and decoding process for the video through the intra prediction coding or inter prediction coding, transform, quantization, entropy coding and in-loop filtering, etc. At present, the intelligent method mainly focuses on three aspects: hybrid neural network coding (that is, embedding neural networks instead of traditional coding modules into the video framework), neural network rate-distortion optimization coding and end-to-end video coding. The hybrid neural network coding is generally applied to the inter prediction module, in-loop filtering module and entropy coding module. The neural network rate-distortion optimization coding used the highly nonlinear characteristics of the neural network to train the neural network to be an efficient discriminator and classifier, for example, it is applied to the decision-making link of video coding mode. At present, the end-to-end video coding is generally classified into replacing all modules of traditional coding method with CNN, or expanding the input dimension of the neural network to perform end-to-end compression for all frames.

In the related art, referring to FIG. 1, FIG. 1 illustrates a schematic diagram of the overall framework of an encoding and decoding system. As illustrated in FIG. 1, for the input data to be encoded, the encoding method includes E1 and E2. E1 refers to the process of extracting feature data and encoding process, and the feature data may be obtained after passing through E1. E2 refers to the process of processing the feature data and obtaining the bitstream, that is, the bitstream may be obtained after passing through E2. Correspondingly, the decoding method includes D1 and D2. D2 refers to the process of receiving the bitstream and parsing the bitstream into the feature data. That is, the reconstruction feature data may be obtained after passing through D2. D1 refers to the process of transforming the reconstruction feature data into decoded data through the traditional method or based on the neural network. That is, the decoded data (specifically, "decoded picture") may be obtained after passing through D1.

Figure 2:
FIG. 2 is a schematic diagram of the overall framework of an intelligent task network.

In addition, in the embodiments of the present disclosure, the intelligent task network generally analyze the picture or video to complete the task objectives, such as target detection, target tracking or behavior recognition. The input of the intelligent task network is the decoded data obtained though the encoding method and decoding method, and the processing flow of the intelligent task network is generally includes A1 and A2. A1 refers to the process of performing feature extraction for the input decoded data and obtaining the feature data for the target of intelligent task network, while A2 refers to the process of processing the feature data and obtaining the result. Specifically, referring FIG. 2, FIG. 2 illustrates a schematic diagram of the overall framework of an intelligent task network. As illustrated in FIG. 2, for the input decoded data, the feature data may be obtained after passing through A1, and the target result may be obtained after the feature data passes through A2.

Figure 3:
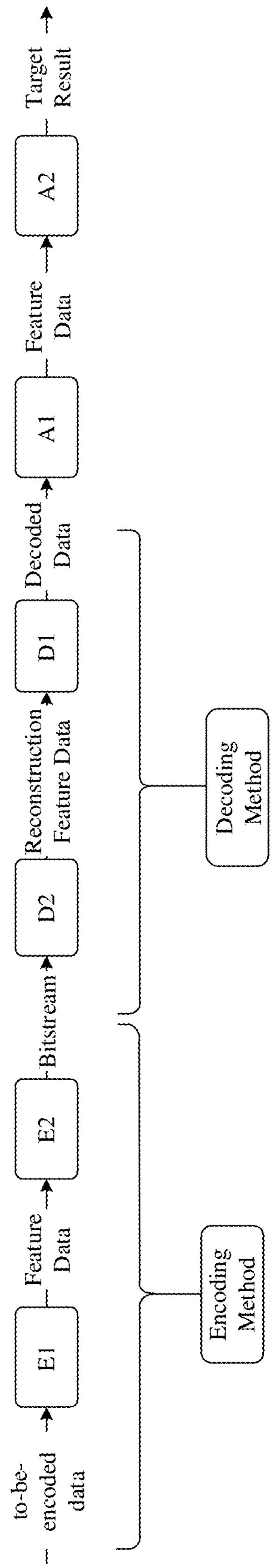
FIG. 3 is a schematic diagram of the overall framework that an encoding and decoding system and an intelligent task network are cascaded.

It is to be understood that the input data of the intelligent task network generally is the decoded data obtained through the encoding method and decoding method, and the decoded data is directly used as the input of the intelligent task network. Referring to FIG. 3, FIG. 3 illustrates a schematic diagram of the overall framework that an encoding and decoding system and an intelligent task network are cascaded. As illustrated in FIG. 3, the encoding method and the decoding method constitute an encoding and decoding system, and after obtaining the decoded data through the encoding method and the decoding method, the decoded data is directly input to A1, and the feature data may be obtained after passing through A1. Then A2 is used to process the feature data, so as to obtain the target result output by the intelligent task network.

In this way, the decoded data obtained through the encoding method and the decoding method is directly input into the intelligent task network. On one hand, the decoded data may include a large amount of redundant information that is not needed by the intelligent task network, and the transmission of these redundant information leads to waste of bandwidth or reduction of efficiency of the intelligent task network. On the other hand, the correlation between the end-to-end encoding and decoding process and the intelligent task network is almost zero, which results in the inability to optimize the encoding and decoding process for the intelligent task network.

On the basis of the above, the embodiment of the disclosure provides an encoding method, which is applied to an encoder. The feature extraction for input picture data is performed by using an intelligent task network to obtain initial feature data. The encoding process is performed for the initial feature data by using an encoding network, and the obtained encoded bits are signalled in a bitstream.

The embodiment of the disclosure also provides a decoding method, which is applied to the decoder. The bitstream is parsed to determine a reconstruction feature data. The feature analysis is performed on the reconstruction feature data by using an intelligent task network to determine a target result.

In this way, the feature extraction of the intelligent task network is used as the input of the encoding network, it not only can better learn the picture information required by the intelligent task network, but also can save the process of picture restoration and extracting the feature data for restoring picture in related arts, so that the decoding network can execute the process of the intelligent task network without restoring to the picture dimension, thereby greatly reducing the complexity of the intelligent task network, and further improving the accuracy and speed of the intelligent task network.

The embodiments of the present disclosure will be described in detail below with reference to the accompanying drawings.

Figure 4A:
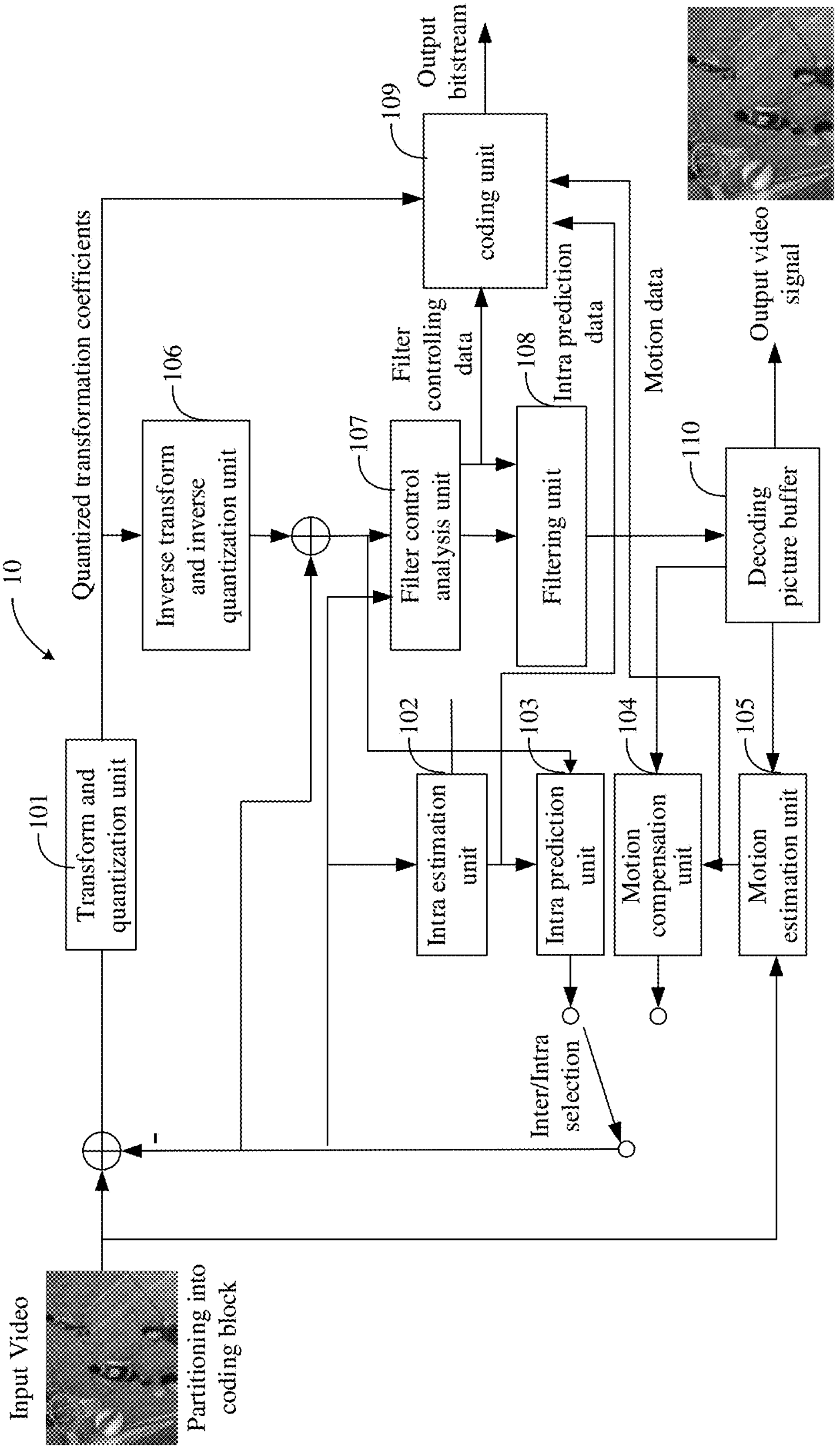
FIG. 4A is a schematic diagram of the detail framework of an encoder according to an embodiment of the present disclosure.

Referring to FIG. 4A, FIG. 4A illustrates a schematic diagram of the detail framework of an encoder according to an embodiment of the present disclosure. As illustrated in FIG. 4A, the encoder 10 includes a transform and quantization unit 101, an intra estimation unit 102, an intra prediction unit 103, a motion compensation unit 104, a motion estimation unit 105, an inverse transform and inverse quantization unit 106, a filter control analysis unit 107, a filtering unit 108, a coding unit 109, a decoding picture buffer 110, etc. The filtering unit 108 can implement Directional Bilateral Filtering (DBF) filtering/Sample Adaptive Offset (SAO) filtering/Adaptive Loop Filter (ALF) filtering, and the coding unit 109 can implement header information coding and Context-based Adaptive Binary Arithmetic Coding (CABAC). A video coding block may be obtained by the partition of a coding tree unit (CTU) for an input original video signal. Then, the residual pixel information obtained after intra prediction or inter prediction is processed by the transform and quantization unit 101, to transform the video coding block, which includes transforming the residual information from a pixel domain to a transform domain, and quantizing the obtained transform coefficient to further reduce the bit rate. The intra estimation unit 102 and the intra prediction unit 103 are used to perform intra prediction for the video coding block. Specifically, the intra estimation unit 102 and the intra prediction unit 103 are used to determine an intra prediction mode to be used to encode the video coding block. The motion compensation unit 104 and the motion estimation unit 105 are used to perform inter prediction coding for the received video coding block with respect to one or more blocks of the one or more reference frames to provide temporal prediction information. The motion estimation performed by the motion estimation unit 105 is a process of generating the motion vector, the motion vector may be used to estimate the motion of the video coding block, and then motion compensation is performed by the motion compensation unit 104 based on the motion vector determined by the motion estimation unit 105. After determining the intra prediction mode, the intra prediction unit 103 is further used to supply the selected intra prediction data to the coding unit 109, and the motion estimation unit 105 also transmits the calculated determined motion vector data to the coding unit 109. Further, the inverse transform and inverse quantization unit 106 is used for the reconstruction of the video coding block, the residual block is reconstructed in the pixel domain, the blocking artifact is removed from the residual block through the filter control analysis unit 107 and the filtering unit 108, and then the reconstructed residual block is added to a prediction block in the frame of the decoding picture buffer 110 to generate the reconstructed video coding block. The coding unit 109 is used to encode various encoding parameters and quantized transform coefficients. In the CABAC-based encoding algorithm, the context content may be based on the neighbouring coding blocks, and may be used to encode information indicating the determined intra prediction mode, and output the bitstream of the video signal. The decoding picture buffer 110 is used to store the reconstructed video coding block for prediction reference. As the video picture coding proceeds, new reconstructed video coding blocks are continuously generated and all of these reconstructed video coding blocks are stored in the decoding picture buffer 110.

Figure 4B:
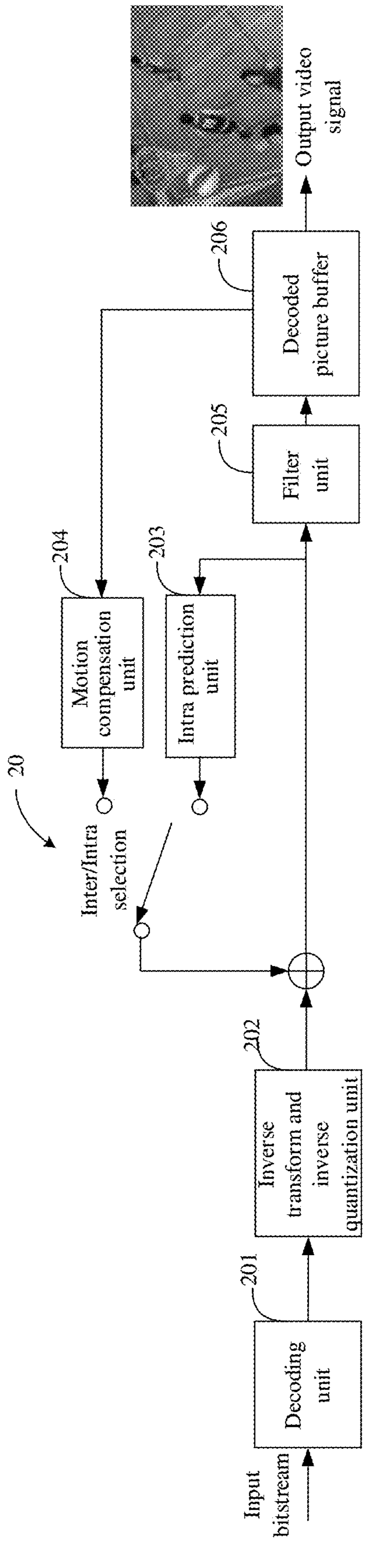
FIG. 4B is a schematic diagram of the detail framework of a decoder according to an embodiment of the present disclosure.

Referring to FIG. 4B, FIG. 4B illustrates a schematic diagram of the detail framework of a decoder according to an embodiment of the present disclosure. As illustrated in FIG. 4B, the decoder 20 includes a decoding unit 201, an inverse transform and inverse quantization unit 202, an intra prediction unit 203, a motion compensation unit 204, a filtering unit 205, a decoding picture buffer unit 206, etc. The decoding unit 201 may implement header information decoding and CABAC decoding, and the filtering unit 205 may implement DBF filtering/SAO filtering/ALF filtering. After the input video signal passes through encoding process in FIG. 4A, a bitstream of the video signal is output. The bitstream is input into a video decoding system 20, and first passes through a decoding unit 201 to obtain decoded transform coefficient. This transform coefficient is processed by an inverse transform and inverse quantization unit 202 to generate a residual block in the pixel domain. The intra prediction unit 203 may be used to generate the prediction data for the current video coding block based on the determined intra prediction mode and data from previously decoded block of the current frame or picture. The motion compensation unit 204 determines the prediction information for the video coding block by parsing the motion vector and other associated syntax elements, and uses the prediction information to generate the prediction block for the video coding block being decoded. The decoded video block is formed by summing the residual block from the inverse transform and inverse quantization unit 202 and the corresponding prediction block generated by the intra prediction unit 203 or the motion compensation unit 204. The decoded video signal passes through the filtering unit 205 so as to remove the blocking artifact, such that the video quality can be improved. The decoded video block is then stored in a decoding picture buffer unit 206, the decoding picture buffer unit 206 stores a reference picture for subsequent intra prediction or motion compensation, while also being used for the output of the video signal, that is, the restored original video signal is obtained.

Figure 5:
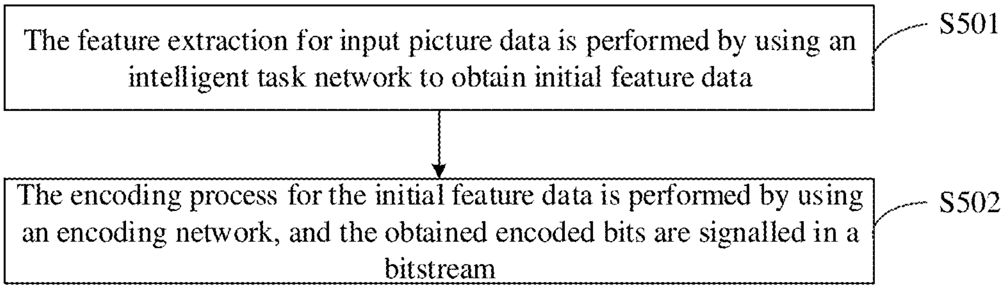
FIG. 5 is a flowchart of an encoding method according to an embodiment of the present disclosure.

In an embodiment of the present disclosure, referring to FIG. 5, FIG. 5 illustrates a flowchart of an encoding method provided by the embodiment of the present disclosure. As illustrated in FIG. 5, the method may include operations S501 to S502.

At S501, the feature extraction for input picture data is performed by using an intelligent task network to obtain initial feature data.

At S502, the encoding process for the initial feature data is performed by using an encoding network, and the obtained encoded bits are signalled in a bitstream.

It is to be noted that the encoding method is applied to the encoder. In embodiments of the present disclosure, the encoder may include an intelligent task network and an encoding network. The intelligent task network is used to implement the feature extract for the input picture data, and the encoding network is used to perform encoding process for the initial feature data. In this way, the feature extraction of intelligent task network is used as the input of the encoding network, which can facilitate the encoding network to learn the picture information needed by the intelligent task network better.

It is also to be noted that in the encoder, after extracting the initial feature data, the intelligent task network will not execute the subsequent processing flow of the intelligent task network, but directly use the encoding nodes with the same dimension to performing encoding process for the initial feature data, such that in the decoder, after the reconstruction feature data is determined by the decoding network, the subsequent processing flow of the intelligent task network can be executed on the reconstruction feature data. In this way, it not only can better learn the picture information required by the intelligent task network, but also can save the process of picture restoration and extracting the feature data for restoring picture in related arts, so that the decoding network can execute the process of the intelligent task network without restoring to the picture dimension, thereby greatly reducing the complexity of the intelligent task network.

In some embodiments, for an intelligent task network, the intelligent task network may at least include a feature extraction sub-network. The operation of performing feature extraction for the input picture data by using the intelligent task network to determine the initial feature data may include that: feature extraction for the input picture data is performed by using the feature extraction sub-network to obtain initial feature data at a first feature node.

Further, in some embodiments, the feature extraction sub-network may include N feature extraction layers, where N is an integer greater than or equal to 1. Correspondingly, the operation of performing feature extraction for the input picture data by using the feature extraction sub-network to obtain the initial feature data at the first feature node may include following operations.

When N is equal to 1, the feature extraction for the input picture data is performed by using the feature extraction layer to obtain initial feature data at a first feature node.

When N is greater than 1, the feature extraction for the input picture data is performed by using N feature extraction layer to obtain initial feature data at a first feature node.

It is to be understood that the first feature node may be a feature node corresponding to different feature extraction layers, and for which feature extraction layer, it is specifically determined according to the actual situation. For example, when it is determined in the intelligent task network that the encoding and decoding processes are needed after a certain feature extraction layer, the feature node corresponding to this feature extraction layer is the first feature node, and these feature extraction layers form a feature extraction sub-network, and the initial feature data extracted after passing through this feature extraction layer will be input into the encoding network.

That is, the initial feature data at the first feature node may be obtained by performing feature extraction by one feature extraction layer or by performing feature extraction by two or more feature extraction layers, which is not limited in the embodiments of the present disclosure.

For example, if the encoding and decoding processes are required after the first feature extraction layer, then the first feature node is the feature node corresponding to the first feature extraction layer, the extracted feature data is the initial feature data to be input into the encoding network, and the feature extraction sub-network is only the first feature extraction layer. If the encoding and decoding processes are required after the second feature extraction layer, then the first feature node is the feature node corresponding to the second feature extraction layer, the feature data extracted at this case is the initial feature data to be input into the encoding network, and the feature extraction sub-network is the first feature extraction layer and the second feature extraction layer.

Further, after obtaining the initial feature data at the first feature node, the case that it corresponds to the to-be-encoded feature data at which encoding node in the encoding network is related to the dimensions of the both. Therefore, in some embodiments, the method further includes that:

- when a data dimension of a first encoding node in the encoding network matches with a data dimension of the first feature node, the initial feature data at the first feature node is determined as to-be-encoded feature data at the first encoding node; or
- when the data dimension of the first encoding node in the encoding network does not match with the data dimension of the first feature node, a data dimension conversion for the initial feature data at the first feature node is performed by using an adaptation network to obtain to-be-encoded feature data at the first encoding node.

It is to be understood that in the embodiments of the present disclosure, when the parameters such as the number of feature space channels and the resolution at the first feature node are completely consistent with the parameters such as the number of feature space channels and the resolution at the first encoding node, it may be determined that the data dimension of the first feature node in the intelligent task network are matched with the data dimension of the first encoding node in the encoding network. That is, after the initial feature data at the first feature node is extracted and obtained according to the intelligent task network, the encoding processing may be performed by using directly the corresponding first encoding node with the same data dimension in the encoding network. The initial feature data is inputted to a first encoding node in the encoding network, an encoding process for the initial feature data is performed by the encoding network, and the obtained encoded bits are signalled in the bitstream.

It is further to be understood that in the embodiments of the present disclosure, when the parameters such as the number of the feature space channels and the resolution at the first feature node are not completely consistent with the parameters such as the number of the feature space channels and the resolution of the first encoding node in the encoding network, the case that the data dimension of the first feature node in the intelligent task network does not match with the data dimension of the first encoding node in the encoding network may occur. At this case, the data dimension conversion for the initial feature data at the first feature node is performed by using an adaptation network to obtain the to-be-encoded feature data at the first encoding node. Thus, the operations of performing the encoding process for the initial feature data by the encoding network and signalling the obtained encoded bits in the bitstream may include that: the to-be-encoded feature data is input to a first encoding node in the encoding network, the encoding process for the to-be-encoded feature data is performed by using the encoding network and the obtained encoded bits is signalled in the bitstream.

It is further to be understood that in embodiments of the present disclosure, the adaptation network herein may include a one-layer or multi-layer network structure, and the network structure may use, but is not limited to, up-sampling, down-sampling, selecting or repeating part of channels, etc. That is, in the cascade of the intelligent task network and the encoding network, there will also be a problem that the spatial resolution or the number of channels of the feature map inputted to analysis network and the reconstruction feature map do not match with each other. On the basis of the above, a single-layer or multi-layer network structure can be added as an adapter to perform the feature dimension conversion process, so as to adapt the cascade of the two networks. Herein the network structure of the adapter may use, but is not limited to, up-sampling, down-sampling, selecting or repeating part of channels, etc., which is not limited herein.

It is to be understood that the embodiments of the present disclosure mainly provide an intelligent fusion network model in which an end-to-end encoding and decoding network and an intelligent task network are cascaded. The end-to-end encoding and decoding network includes an encoding network and a decoding network. In other words, the intelligent fusion network model may include the encoding network, the decoding network and the intelligent task network. The encoding network and part of the intelligent task network are used in the encoder, and the decoding network and the other part of the intelligent task network are used in the decoder.

In the embodiments of the present application, the training for the intelligent fusion network model may be performed in an encoder, a decoder, or even in both the encoder and the decoder, which is not limited herein.

In one possible implementation, for the training of the intelligent fusion network model, the method may further include following operations.

At least one training sample is determined.

A preset network model is trained by using the at least one training sample. The preset network model includes an initial encoding network, an initial decoding network and an initial intelligent task network, and the initial encoding network and the initial decoding network are connected with the initial intelligent task network through a node.

When a loss function corresponding to the preset network model converges to a preset threshold value, a model obtained after training is determined as an intelligent fusion network model. The intelligent fusion network model includes the encoding network, a decoding network and the intelligent task network.

In a specific embodiment, the loss function corresponding to the preset network model may be divided into two parts: a loss function of the encoding and decoding network and a loss function of the intelligent task network. Therefore, in some embodiments, the method further includes following operations.

The first rate-distortion tradeoff parameter of the intelligent task network, the loss value of the intelligent task network, the second rate-distortion tradeoff parameter of the encoding and decoding network, the distortion value and the bit rate of the bitstream of the encoding and decoding network are determined.

The loss function corresponding to the preset network model is determined according to the first rate-distortion tradeoff parameter, the second rate-distortion tradeoff parameter, the loss value of the intelligent task network, the distortion value and the bit rate of the bitstream of the encoding and decoding network.

That is, in the embodiment of the present disclosure, the retraining method of the intelligent fusion network model may be to jointly train a fusion network formed by connecting the initial intelligent task network and the initial encoding and decoding network through the node. Exemplarily, the loss function may be as follows, $$\text{loss} = R + \lambda_1 \cdot \text{loss}_{task} + \lambda_2 D(x, \hat{x}) \tag{1}$$

where R denotes the bit rate of the bitstream of the encoding and decoding network, $\lambda_1$, $\lambda_2$ denote the rate-distortion tradeoff parameters, and different $\lambda_1$, $\lambda_2$ correspond to different models, i.e., different total bit rates; $\text{loss}_{task}$ denotes the loss value of the intelligent task network, $D(x, \hat{x})$ denotes the distortion value between the input picture and the decoding picture. Here, x and $\hat{i}$ denote the data at the encoding node and the reconstruction node used by the encoding and decoding network, respectively, instead of the picture data. In addition, the distortion value here may be measured by using Mean Squared Error (MSE).

With regard to equation (1), it may be regarded as two parts: $\lambda_1 \cdot \text{loss}_{task}$ denotes the loss function of the intelligent task network, $R+\lambda_2 D(x, \hat{x})$ denotes the loss function of the encoding and decoding network. That is, the loss function of the intelligent fusion network model may be obtained through both the loss function of the intelligent task network and the loss function of the encoding and decoding network.

The values of $\lambda_1$ and $\lambda_2$ are specifically set according to the actual situation. For example, the value of $\lambda_1$ is 0.3, and the value of $\lambda_2$ is 0.7, which is not limited herein.

It is to be noted that the retraining method of the intelligent fusion network model in the embodiments of the present disclosure may also be performed step by step. For example, firstly the value of $\lambda_2$ may be set to zero, and the value of $\lambda_1$ is set to any value, at this case, the training is performed for the intelligent task network. Then the value of $\lambda_1$ is set to zero, and the value of $\lambda_2$ is any value, at this case, the training is performed for the encoding and decoding network (including the encoding network and decoding network). Finally, joint training is performed. The training method is not limited herein, it may also be other training methods, or even a combination of different training methods.

It is also to be noted that for the intelligent task network, the intelligent task network may include a feature extraction sub-network and a feature analysis sub-network. The feature extraction sub-network may be used to perform the feature extraction of the input picture data to determine the initial feature data, and then the encoding network performs the encoding process for the initial feature data. The feature analysis sub-network may be used to perform the feature analysis for the input feature data to determine the target result, which may refer to complete the task objectives such as target detection, target tracking or behavior recognition.

Thus, after training to obtain the intelligent task network, in some embodiments, the method may further include following operations.

The feature extraction for the input picture data is performed by using the feature extraction sub-network to obtain initial feature data.

The feature analysis for the initial feature data is performed by using the feature analysis sub-network to determine the target result.

That is, after the training, the intelligent task network that has completed the training may directly perform the feature extraction and feature analysis for the input picture data, and at this case, the target result may be determined without passing through the encoding network and decoding network. For example, in the case of processing of local picture, there is no need to pass through the end-to-end encoding and decoding network to perform the data transmission. At this case, after the intelligent task network (including feature extraction sub-network and feature analysis sub-network) is obtained by training, it may also be applied to picture analysis and processing to obtain the target result of the intelligent task.

The embodiments of the disclosure provide an encoding method, which is applied to an encoder. The feature extraction for input picture data is performed by using an intelligent task network to obtain initial feature data. The encoding processing for the initial feature data is performed by using an encoding network, and the obtained encoded bits are signalled in a bitstream. In this way, the feature extraction of the intelligent task network is used as the input of the encoding network, it not only can better learn the picture information required by the intelligent task network, but also can save the processes of picture restoration and extracting the feature data for restoring picture in related arts, thereby greatly reducing the complexity of the intelligent task network, and further improving the accuracy and speed of the intelligent task network.

In another embodiment of the present disclosure, the embodiment of the present application provides a bitstream. The bitstream is generated by performing bit encoding according to the to-be-encoded information.

In the embodiments of the present disclosure, the to-be-encoded information at least incudes initial feature data, and the initial feature data is obtained by performing feature extraction for the input picture data through an intelligent task network. In this way, after the encoder generates the bitstream, it may be transmitted to the decoder, so that the decoder can subsequently obtain the reconstruction feature data by parsing the bitstream.

Figure 6:
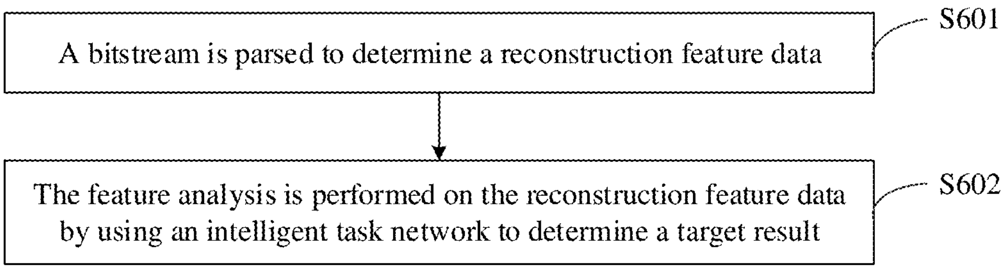
FIG. 6 is a flowchart of a decoding method according to an embodiment of the present disclosure.

In another embodiment of the present disclosure, referring to FIG. 6, FIG. 6 illustrates a flowchart of a decoding method provided by the embodiment of the present disclosure. As illustrated in FIG. 6, the method may include operations S601 to S602.

At S601, a bitstream is parsed to determine a reconstruction feature data.

At S602, the feature analysis is performed on the reconstruction feature data by using an intelligent task network to determine a target result.

It is to be noted that the decoding method is applied to the decoder. In the embodiments of the present disclosure, the decoder may include a decoding network. Thus, for operation S601, the operation that the bitstream is parsed to determine the reconstruction feature data may further include that: the bitstream is parsed by using the decoding network to determine the reconstruction feature data.

It is further to be understood that in the embodiments of the present disclosure, the decoder not only has a decoding function, but also may have an intelligent analysis function. That is, the decoder in the embodiments of the present application includes an intelligent task network in addition to the decoding network. In this way, in the decoder, there is no need to reconstruct to the decoded picture, but reconstructing to the feature space, that is, after obtaining the reconstruction feature data by decoding, the intelligent task network may be used to perform feature analysis for the reconstruction feature data, so as to determine the target result, which may indicate completing the task objectives such as target detection, target tracking or behavior recognition.

In some embodiments, the operation of parsing the bitstream to determine the reconstruction feature data may include:

parsing the bitstream, and when a data dimension of a first feature node in the intelligent task network matches with a data dimension of a first reconstruction node, determining a candidate reconstruction feature data at the first reconstruction node as the reconstruction feature data; or parsing the bitstream, and when the data dimension of the first feature node in the intelligent task network does not match with the data dimension of the first reconstruction node, performing the data dimension conversion for the candidate reconstruction feature data at the first reconstruction node by using an adaptation network to obtain the reconstruction feature data.

It is to be noted that not all the reconstruction feature data obtained by decoding meet the requirements, and it is related to the data dimension of the feature node in intelligent task network. Specifically, when a data dimension of a first feature node in the intelligent task network matches with a data dimension of a first reconstruction node, a candidate reconstruction feature data at the first reconstruction node may be determined as the reconstruction feature data at the first feature node of the intelligent task network. That is, it is to be understood that in the embodiments of the present disclosure, when the parameters such as the number of feature space channels and the resolution at the first feature node are completely consistent with the parameters such as the number of feature space channels and the resolution at the first reconstruction node, it may be determined that the data dimension of the first feature node in the intelligent task network are matched with the data dimension of the first reconstruction node in the decoding network.

It is further to be understood that in the embodiments of the present disclosure, when the parameters such as the number of the feature space channels and the resolution at the first feature node in the intelligent task network are not completely consistent with the parameters such as the number of the feature space channels and the resolution of the first reconstruction node, that is, the case that the data dimension of the first feature node in the intelligent task network does not match with the data dimension of the first reconstruction node may occur. At this case, the data dimension conversion for the candidate reconstruction feature data at the first reconstruction node is performed by using an adaptation network to obtain the reconstruction feature data.

It is further to be understood that the adaptation network herein may include a one-layer or multi-layer network structure, and the network structure may use, but is not limited to, up-sampling, down-sampling, selecting or repeating part of channels, etc. That is, in the cascade of the intelligent task network and the decoding network, there will also be a problem that the spatial resolutions or the number of channels of the feature map inputted to analysis network and the reconstruction feature map do not match with each other. On the basis of the above, a single-layer or multi-layer network structure can be added as an adapter to perform the feature dimension conversion processing, so as to adapt the cascade of the two networks. Herein the network structure of the adapter may use, but is not limited to, up-sampling, down-sampling, selecting or repeating part of channels, etc., which is not limited herein.

Further, after determining the reconstruction feature data, in some embodiments, for S602, the operation that the feature analysis for the reconstruction feature data is performed by using an intelligent task network to determine a target result may include that:

the reconstruction feature data is input to the first feature node in the intelligent task network, and feature analysis for the reconstruction feature data is performed by using the intelligent task network to obtain the target result.

It is to be understood that the first feature node may be a feature node corresponding to different feature extraction layers, and for which feature extraction layer, it is specifically determined according to the actual situation. For example, when it is determined in the intelligent task network that the encoding and decoding processes are needed after a certain feature extraction layer, the feature node corresponding to this feature extraction layer is the first feature node, and the obtained initial feature data which is extracted after passing through that feature extraction layer will be processed through the encoding network and the decoding network, such that the reconstruction feature data at the first feature node may be obtained, and then the target result can be obtained through analysis.

It is to be understood that for the intelligent task network, the intelligent task network may include a feature extraction sub-network and a feature analysis sub-network. Accordingly, in some embodiments, in a specific embodiment, the operation that the feature analysis is performed on the reconstruction feature data by using an intelligent task network to determine a target result may include following operation.

When the first feature node is a feature node obtained after passing through the feature extraction sub-network, the reconstruction feature data is input to the first feature node, and feature analysis for the reconstruction feature data is performed by using the feature analysis sub-network to obtain the target result.

It is to be noted that the feature extraction sub-network may include several feature extraction layers. The first feature node may be obtained by passing through a feature extraction layer or passing through two or more feature extraction layers, which is not limited in the embodiments of the present disclosure.

For example, if it is determined in the intelligent task network that the encoding and decoding processes are required after the fourth feature extraction layer, that is, the first feature node is a feature node corresponding to the fourth feature extraction layer, the feature extraction sub-network includes four feature extraction layers, and the reconstruction feature data obtained after the fourth feature extraction layer is input to the feature analysis sub-network for feature analysis, and the target result can be obtained. If it is determined in the intelligent task network that the encoding and decoding processes are required after the second feature extraction layer, that is, the first feature node is the feature node corresponding to the second feature extraction layer, the feature extraction sub-network includes two feature extraction layers, and the reconstruction feature data obtained after the second feature extraction layer is input to the feature analysis sub-network for feature analysis, and thus the target result may be obtained.

In some embodiments, it is also to be noted that for the feature analysis sub-network, the feature analysis sub-network may include a region proposal network (RPN) and a Region Of Interest_Heads (ROI_Heads). The output end of the region proposal network is connected with the input end of the region of interest_heads, and the input end of the region proposal network is also connected with the region of interest_heads, and the output end of the region of interest_heads is used for outputting the target result.

Accordingly, in some embodiments, the operation that the feature analysis is performed on the reconstruction feature data by using a feature analysis sub-network to obtain a target result may include:

processing the reconstruction feature data by the region proposal network to obtain a target region; and performing intelligent analysis for the reconstruction feature data and the target region through the region of interest_heads to obtain the target result.

That is, the feature data is firstly processed through the region proposal network to obtain the target region, and then the reconstruction feature data and the target region are intelligently analyzed through the region of interest_heads, so that the target result may be obtained.

It is further to be understood that the embodiments of the present disclosure mainly provide an intelligent fusion network model in which an end-to-end encoding and decoding network and an intelligent task network are cascaded, and the goal is that the intelligent task network can implement optimal performance through the processing and retraining of the intelligent fusion network model. The end-to-end encoding and decoding network includes an encoding network and a decoding network. In other words, the intelligent fusion network model may include the encoding network, the decoding network and the intelligent task network. The encoding network and part of the intelligent task network are used in the encoder, and the decoding network and the other part of the intelligent task network are used in the decoder.

Further, for the training of the intelligent fusion network model, in some embodiments, the method further includes following operations.

At least one training sample is determined.

A preset network model is trained by using the at least one training sample. The preset network model includes an initial encoding network, an initial decoding network and an initial intelligent task network, and the initial encoding network and the initial decoding network are connected with the initial intelligent task network through a node.

When a loss function corresponding to the preset network model converges to a preset threshold value, a model obtained after training is determined as an intelligent fusion network model. The intelligent fusion network model includes the encoding network, a decoding network and the intelligent task network.

In a specific embodiment, the loss function corresponding to the preset network model may be divided into two parts: the loss function of the encoding and decoding network and the loss function of the intelligent task network. Therefore, in some embodiments, the method further includes following operations.

The first rate-distortion tradeoff parameter of the intelligent task network, the loss value of the intelligent task network, the second rate-distortion tradeoff parameter of the encoding and decoding network, the distortion value and the bit rate of the bitstream of the encoding and decoding network are determined.

The loss function corresponding to the preset network model is determined according to the first rate-distortion tradeoff parameter, the second rate-distortion tradeoff parameter, the loss value of the intelligent task network, the distortion value and the bit rate of the bitstream of the encoding and decoding network.

That is, in the embodiment of the present disclosure, the retraining method of the intelligent fusion network model may be to jointly train a fusion network formed by connecting the initial intelligent task network and the initial encoding and decoding network through the node. Exemplarily, the loss function may be shown as Equation (1) above.

With regard to equation (1), it may be regarded as two parts: $\lambda_1 \cdot loss_{task}$ denotes the loss function of the intelligent task network, $R+\lambda_2 D(x, \hat{x})$ denotes the loss function of the encoding and decoding network. That is, the loss function of the intelligent fusion network model may be obtained through both the loss function of the intelligent task network and the loss function of the encoding and decoding network. The values of $\lambda_1$ and $\lambda_2$ are specifically set according to the actual situation. For example, the value of $\lambda_1$ is 0.3, and the value of $\lambda_2$ is 0.7, which is not limited herein.

It is to be noted that the retraining method of the intelligent fusion network model in the embodiments of the present disclosure may also be performed step by step. For example, firstly the value of $\lambda_2$ may be set to zero, and the value of $\lambda_1$ is set to any value, at this case, the training is performed for the intelligent task network. Then the value of $\lambda_1$ is set to zero, and the value of $\lambda_2$ is any value, at this case, the training is performed for the encoding and decoding network (including the encoding network and decoding network). Finally, joint training is performed. The training method is not limited herein, it may also be other training methods, or even a combination of different training methods.

The embodiments of the disclosure also provide a decoding method, which is applied to the decoder. The bitstream is parsed to determine a reconstruction feature data. The feature analysis is performed on the reconstruction feature data by using an intelligent task network to determine a target result. In this way, it not only can better learn the picture information required by the intelligent task network, but also can save the process of picture restoration and extracting the feature data for restoring picture in related arts, so that the decoding network can execute the process of the intelligent task network without restoring to the picture dimension, thereby greatly reducing the complexity of the intelligent task network, and further improving the accuracy and speed of the intelligent task network.

In another embodiment of the present disclosure, for the input picture data, in the encoder, the feature extraction for the input picture data may first be performed by an intelligent task network, and then the extracted initial feature data is input into the encoding network. That is, the feature extraction part of the intelligent task network is taken as the preprocessing flow of the encoding network, that is, the feature extracted by using the intelligent task network is used as the input of the encoding network, which may help the encoding and decoding network to learn the picture information required by the intelligent task network better. Then, after the bitstream is obtained by performing the encoding process for the initial feature data by using the encoding network, when the bitstream is transmitted to the decoder, the reconstruction feature data may be obtained by parsing the bitstream, and the reconstruction feature data may be input to the intelligent task network for feature analysis. That is, the analysis and processing part of the intelligent task network is used as the subsequent processing flow of the decoding network, such that the decoding network may execute the analysis processing of the intelligent task network without restoring to the picture dimension, thereby greatly reducing the complexity of the intelligent task network.

Figure 7:
FIG. 7 is a flowchart of an intelligent fusion network model according to an embodiment of the present disclosure.

Referring to FIG. 7, FIG. 7 illustrates a flowchart of an intelligent fusion network model according to an embodiment of the present disclosure. As illustrated in FIG. 7, for the input data to be encoded (i.e. input picture data), the feature data may be obtained after passing through the feature extraction of A1. Then, a bitstream may be obtained after passing through the encoding process of E2 for the feature data. After the bitstream is input to D2 for decoding, the reconstruction feature data may be obtained; and after the reconstruction feature data is input to A2 for feature analysis, the target result may be obtained. A1 and A2 belong to the intelligent task network, E2 and D2 belong to the encoding and decoding network. Here, A1 refers to the process of performing feature extraction for the target of intelligent task network for the input data to be encoded and obtaining the feature data. E2 refers to the process of processing the feature data and obtaining the bitstream. D2 refers to the process of receiving the bitstream and parsing the bitstream into reconstruction feature data. A2 refers to the process of processing the reconstruction feature data and obtaining the result.

It is apparent from FIG. 7 that the decoding process does not need to reconstruct to the decoded picture but only needs to reconstruct to the feature space, and then the feature space is used as the input of the intelligent task network instead of using the decoded picture. That is, the feature data extracted through the intelligent task network A1 is encoded and decoded by using E2 and D2, and then the reconstruction feature data decoded through D2 is analyzed through A2, so that the target result may be directly obtained.

In the embodiments of the present application, for the encoding and decoding network and an intelligent task network herein, the encoding and decoding network may be divided into an encoding network and a decoding network. Specifically, the encoding network may use the feature extraction sub-network of the intelligent task network and some nodes of the end-to-end encoding network, and the feature extraction for the input picture data may be performed through the intelligent task network. The intelligent task network may no longer be executed after a certain feature node, but the end-to-end picture compression network of the corresponding encoding node with the same dimension is directly used for compression. After the decoding is performed to the corresponding reconstruction node with the same dimension as the encoding node, the decoding network also inputs the reconstruction feature data at the reconstruction node to the intelligent task network, and the subsequent processing flow of the intelligent task network is performed.

In addition, in the embodiments of the present disclosure, the encoding and decoding network and the intelligent task network used herein may be various commonly used end-to-end encoding and decoding networks and intelligent task networks, regardless of the specific network structure and type. For example, the encoding and decoding network itself can use various variants of neural network structures such as CNN, RNN and GAN. The intelligent task network does not limit the task objectives and network structure, which may be target detection, target tracking, behavior recognition, pattern recognition and other task objectives related to picture processing.

Figure 8:
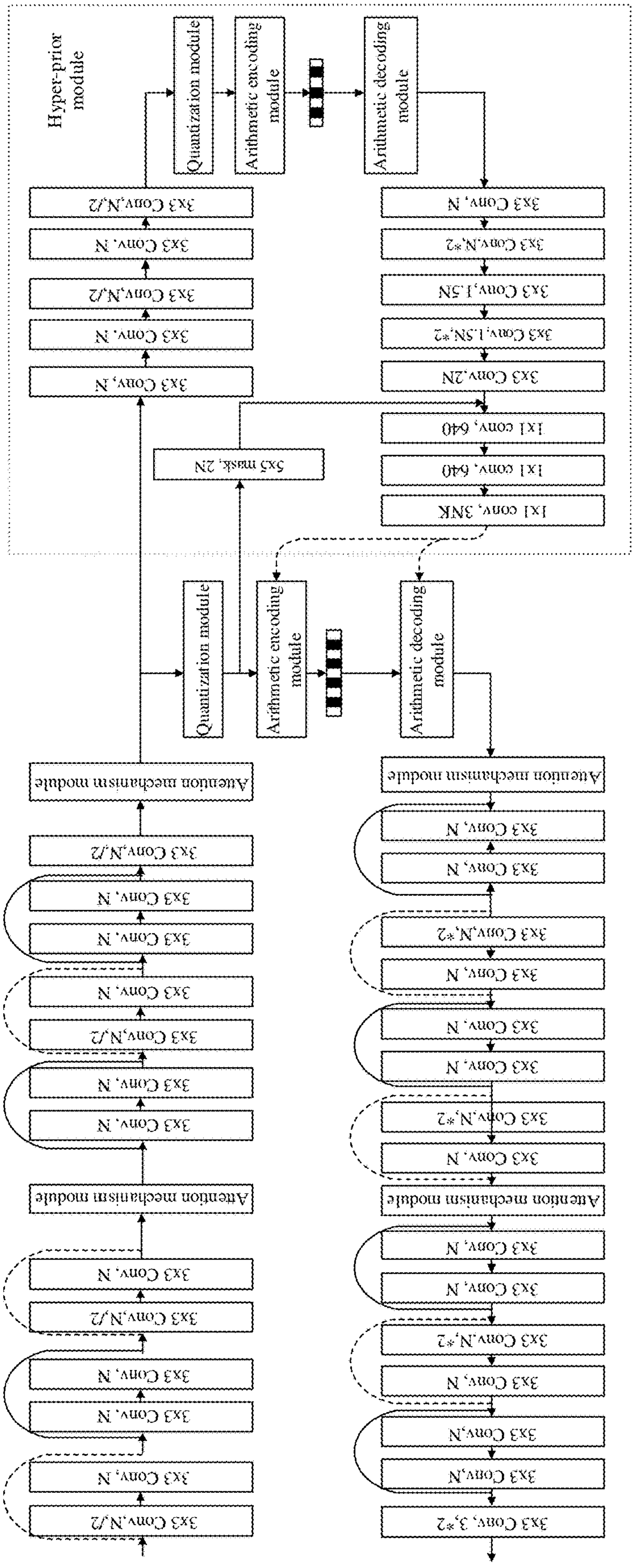
FIG. 8 is a structural schematic diagram of an end-to-end encoding and decoding network according to an embodiment of the present disclosure.

For example, referring to FIG. 8, FIG. 8 illustrates a structural schematic diagram of an end-to-end encoding and decoding network according to an embodiment of the present disclosure. As illustrated in FIG. 8, an encoding network and a decoding network may be included. “Conv” is the abbreviation of Convolution, “1×1”, “3×3”, “5×5” denotes the size of convolution kernels; “N” denotes the number of convolution kernels (i.e. the number of output channels of the convolution layer); “/2” denotes 2 times of down-sampling processing, so that the input size is halved; and “×2” denotes 2 times of up-sampling processing, such that the input size is doubled. Since 2 times of the down-sampling processing is performed in the encoding network, 2 times of the up-sampling processing is correspondingly required in the decoding network.

Figure 9A:
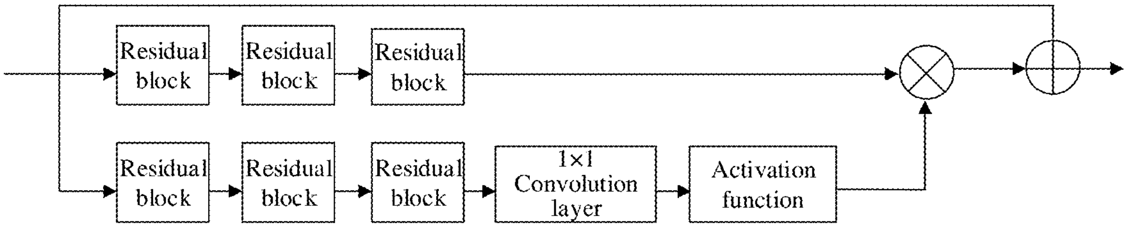
FIG. 9A is a structural schematic diagram of an attention mechanism module according to an embodiment of the present disclosure.
Figure 9B:
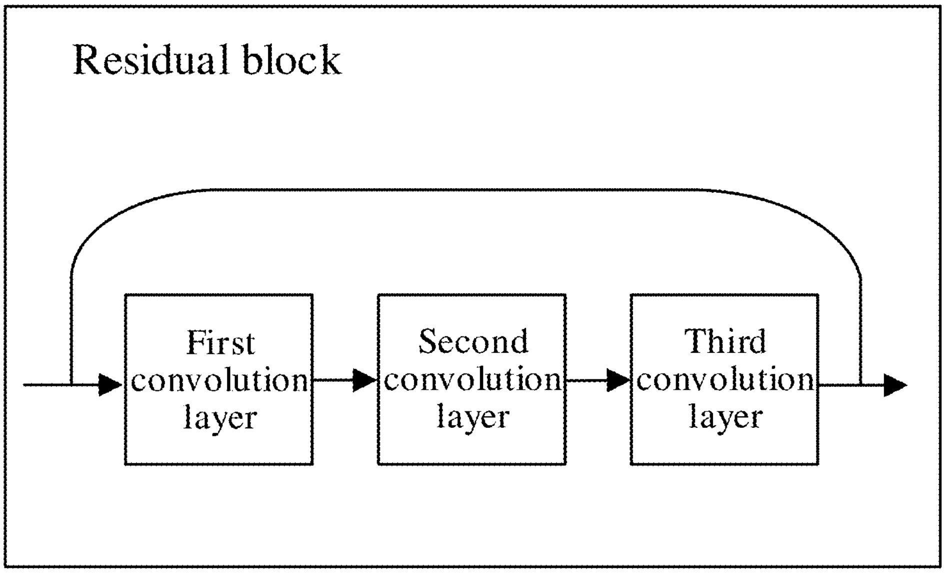
FIG. 9B is a structural schematic diagram of a residual block according to an embodiment of the present disclosure.

It is further to be noted that the encoding and decoding network in FIG. 8 also includes an attention mechanism module. FIG. 9A illustrates a structural schematic diagram of an attention mechanism module according to an embodiment of the present disclosure. As illustrated in FIG. 9A, it may include a Residual Block (RB), 1×1 Convolution layer (denoted by 1×1 Conv) and activation function, a multiplier, and an adder. The activation function may be expressed by Sigmoid function, which is a common S-shaped function, also referred to as S-shaped growth curve. The Sigmoid function is often used as the activation function of neural network, and the variable is mapped between 0 and 1. FIG. 9B illustrates a structural schematic diagram of a residual block according to an embodiment of the present disclosure. As illustrated in FIG. 9B, the residual block may include three convolution layers, such as a first convolution layer, a second convolution layer, and a third convolution layer. The first convolution layer has a convolution kernel size of 1×1 and the number of output channels of N/2, which may be denoted by 1×1 Conv and N/2. The second convolution layer has a convolution kernel size of 3×3 and the number of output channels of N/2, which may be denoted by 3×3 Conv and denoted by N/2. The third convolution layer has a convolution kernel size of 1×1 and the number of output channels of N, which may be denoted by 1×1 Conv and N.

Figure 10:
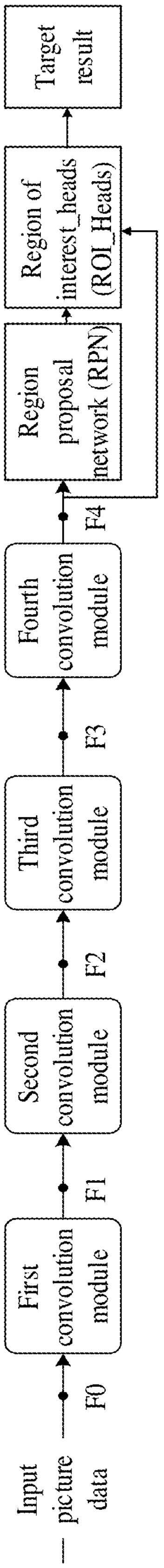
FIG. 10 is a structural schematic diagram of an intelligent task network according to an embodiment of the present disclosure.

Referring to FIG. 10, FIG. 10 illustrates a structural schematic diagram of an intelligent task network according to an embodiment of the present disclosure. As illustrated in FIG. 10, the intelligent task network may include a feature extraction sub-network and a feature analysis sub-network. F0 denotes the input, which is the input picture data. The feature extraction sub-network includes four feature extraction layers: the first feature extraction layer corresponding to the first convolution module, and its corresponding feature node is represented by F1; the second feature extraction layer corresponding to the second convolution module, and its corresponding feature node is represented by F2; the third feature extraction layer corresponding to the third convolution module, and its corresponding feature node is represented by F3; the fourth feature extraction layer corresponding to the fourth convolution module, and its corresponding feature node is represented by F4. The feature analysis sub-network may include a region proposal network (RPN) and a region of interest_heads (ROI_Heads), and the final output is the target result.

Figure 11:
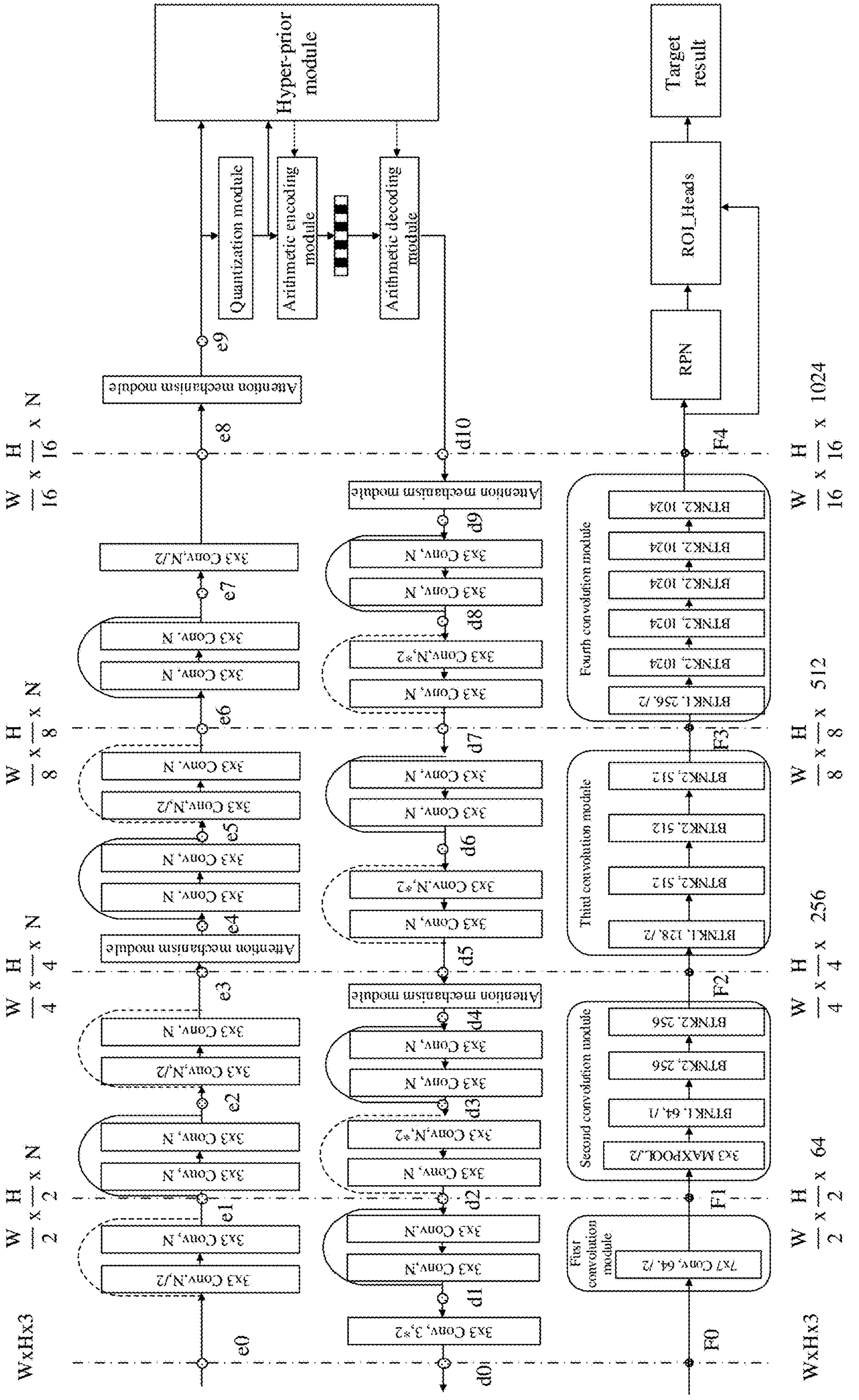
FIG. 11 is a structural schematic diagram of an intelligent fusion network model according to an embodiment of the present disclosure.

Based on the end-to-end encoding and decoding network illustrated in FIG. 8 and the intelligent task network illustrated in FIG. 10, FIG. 11 illustrates a structural schematic diagram of an intelligent fusion network model provided by the embodiment of the present disclosure. As illustrated in FIG. 11, it illustrates a joint network confusing an end-to-end encoding and decoding network and an intelligent task network, and the objective is achieving optimal performance of the intelligent task network through the processing and retraining of the joint network.

In FIG. 11, the encoding nodes such as e0, e1, e2, e3, e4, e5, e6, e7, e8 and e9 are set in the encoding network, the reconstruction nodes such as d0, d1, d2, d3, d4, d5, d6, d7, d8, d9 and d10 are set in the decoding network, and feature nodes such as F0, F1, F2, F3 and F4 are set in the intelligent task network. Herein, e0 and do are the input node and the output node of the end-to-end encoding and decoding, and F0 is the input node of the intelligent task network. For the input size, it is W×H×3. After passing through the first convolution module, because the size is halved, it is $$\frac{W}{2}\times\frac{H}{2}\times 64$$

at this case. After passing through the second convolution module, because the size continues to be halved, it is $$\frac{W}{4}\times\frac{H}{4}\times 256$$

at this case. After passing through the third convolution module, because the size continues to be halved, it is $$\frac{W}{8}\times\frac{H}{8}\times 512$$

at this case. After passing through the fourth convolution module, because the size continues to be halved, it is $$\frac{W}{16} \times \frac{H}{16} \times 1024$$

at this case.

That is, the intelligent fusion network model of the embodiment of the present disclosure is shown in FIG. 11. In the related arts, the input node and output node of the end-to-end encoding and decoding network in the original processing flow are e0 and do, respectively, and the input node of the intelligent task network is F0 (i.e., the decoded picture after passing through the end-to-end encoding and decoding network). In the embodiments of the present disclosure, the fusion network performance of the feature nodes such as F1, F2, F3 and F4 may be explored. Taking the node F1 as an example, the initial feature data at the node F1 of the intelligent task network is firstly taken as the input at the node e1 of the encoding network, and passes through the decoding network to obtain the reconstruction feature data at the node d2, which may be taken as the feature data at the node F1, and then the subsequent intelligent task network processing flow is processed.

It is also to be noted that the number of the feature space channels and the resolution extracted at node d and node e corresponding to different feature layers as illustrated in FIG. 11 need to be completely consistent with that at the corresponding node F of the intelligent task networks. Therefore, in the embodiment of the present disclosure, the data dimensions at d node and e node need to be matched with the data dimension at node F.

Figure 12A:
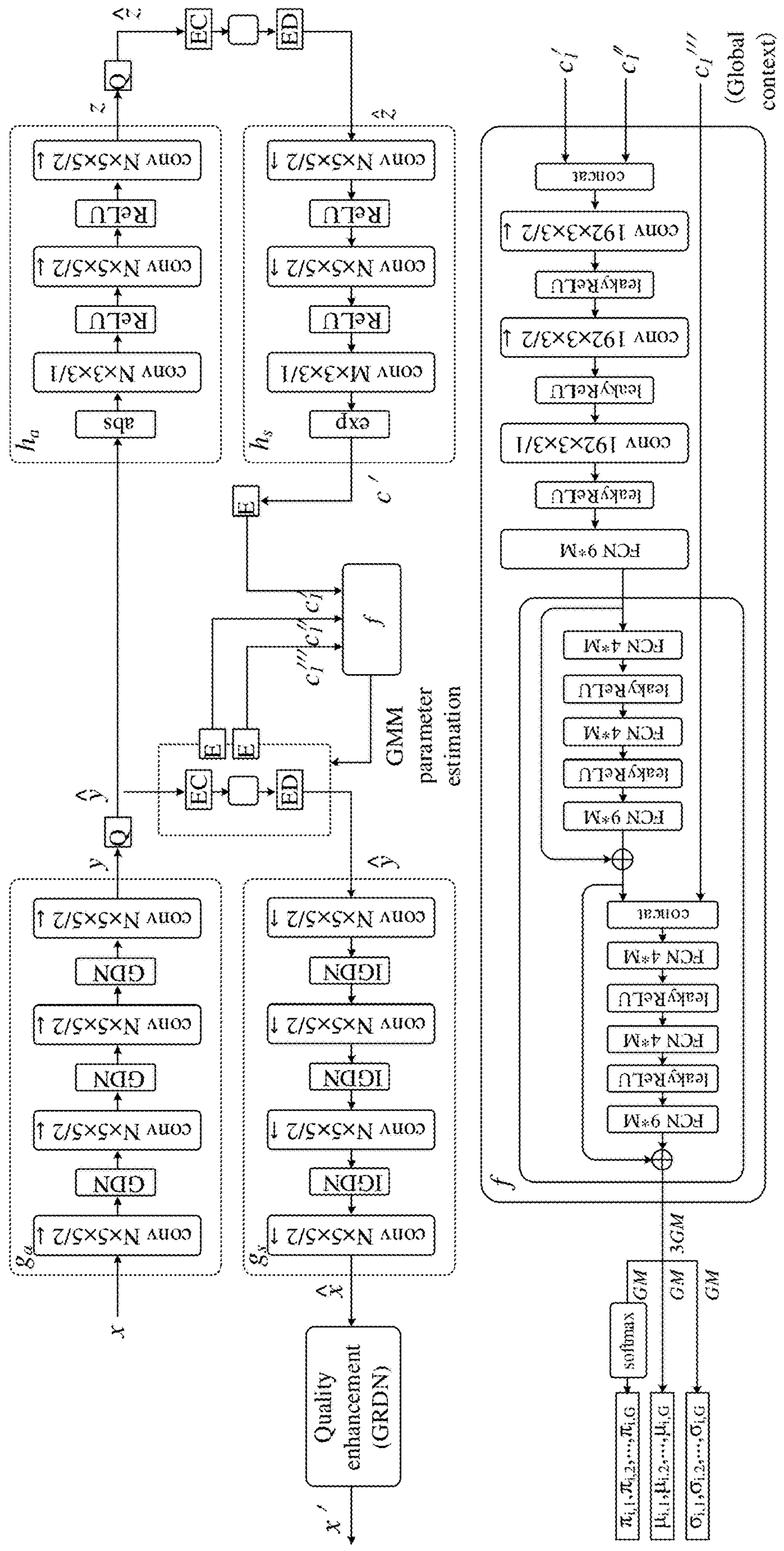
FIG. 12A is a structural schematic diagram of a Lee network model according to an embodiment of the present disclosure.
Figure 12B:
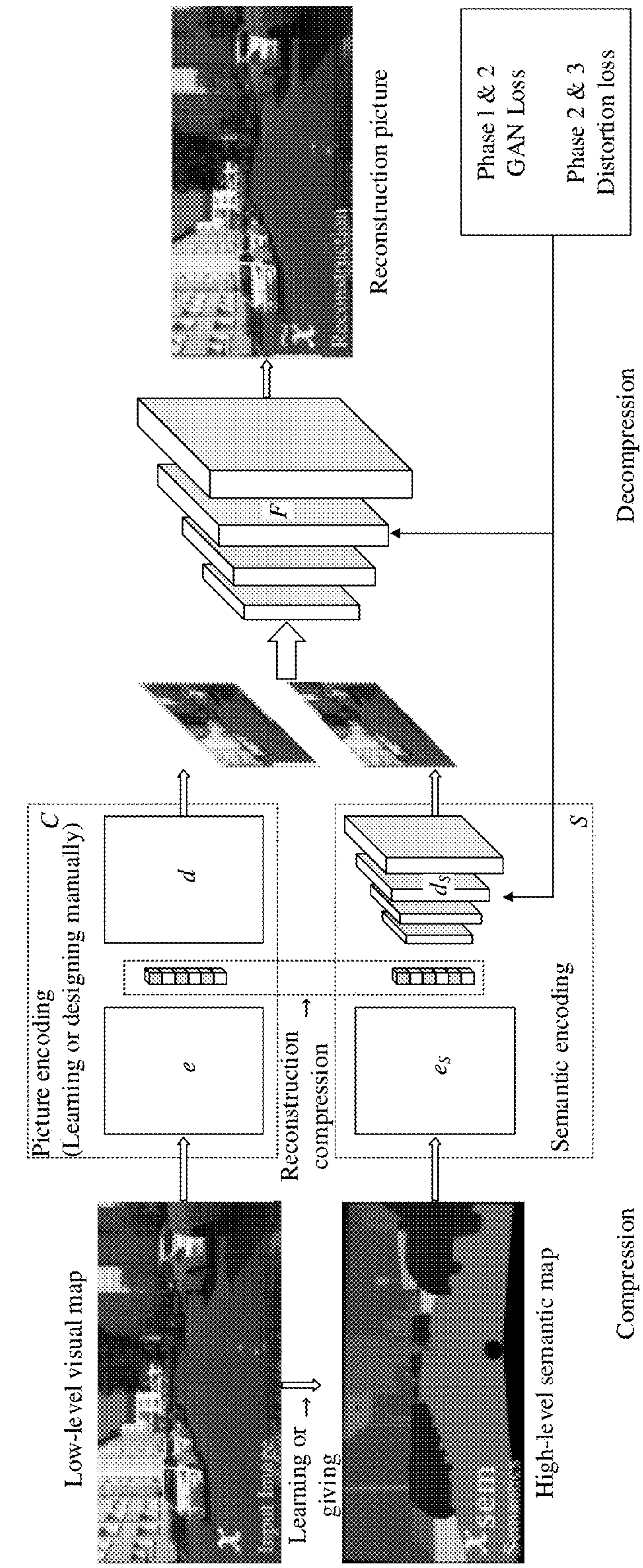
FIG. 12B is a structural schematic diagram of a Duan network model according to an embodiment of the present disclosure.

It is further to be noted that the encoding and decoding network described in the embodiments of the present disclosure may be such as traditional video encoding and decoding, intelligent end-to-end picture encoding and decoding, partial intelligence of traditional video encoding and decoding, end-to-end encoding and decoding of video, etc., which is not limited herein. In addition, the intelligent task network and the end-to-end encoding and decoding network provided by the embodiments of the present disclosure may also be replaced by other common network structures. For example, in the field of end-to-end encoding and decoding, Lee network and Duan network can be used for specific implementation. Lee network adopts transfer learning method to improve the quality of network reconstruction picture, Duan network uses high-level semantic maps to enhance low-level visual features, and it is verified that this method may effectively improve the rate-precision-distortion performance of the picture compression. The compositional structure of the Lee network model is illustrated in FIG. 12A and the compositional structure of the Duan network model is illustrated in FIG. 12B.

Figure 13A:
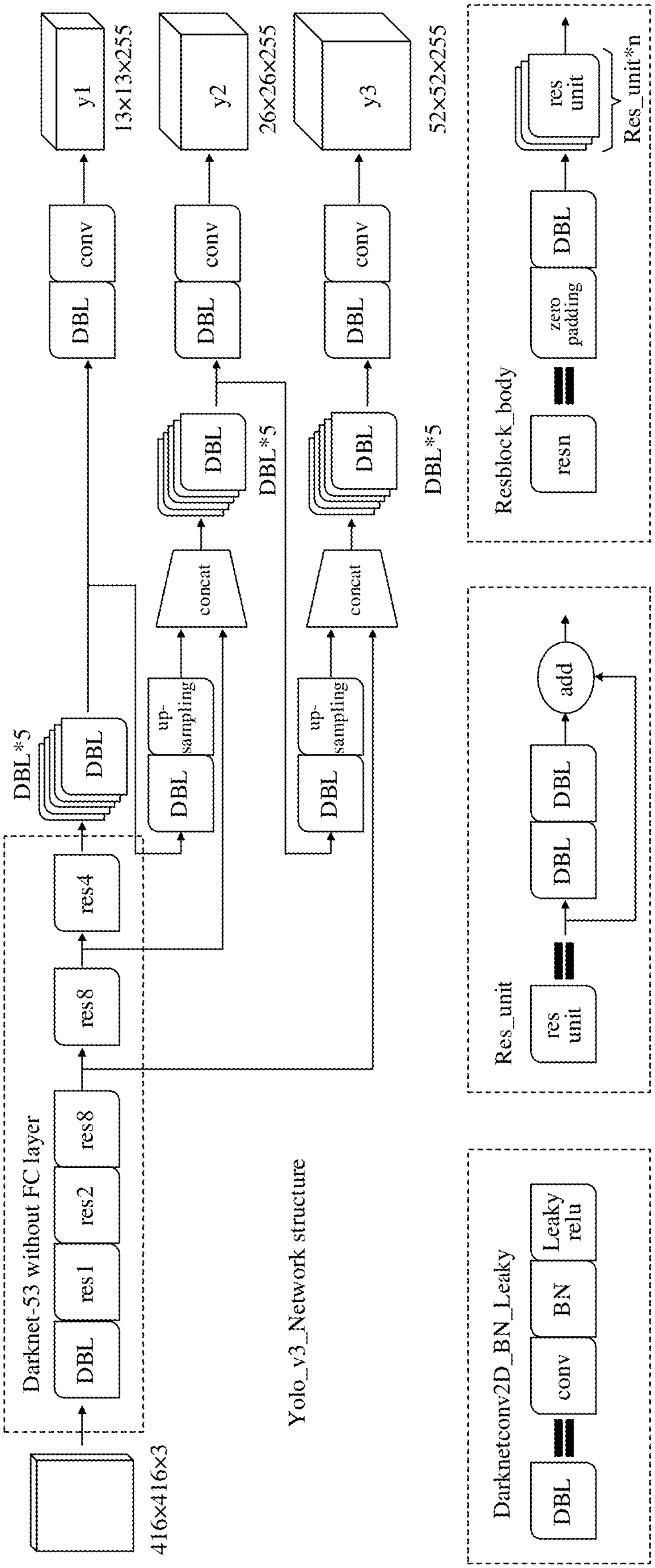
FIG. 13A is a structural schematic diagram of a yolo_v3 network model according to an embodiment of the present disclosure.
Figure 13B:
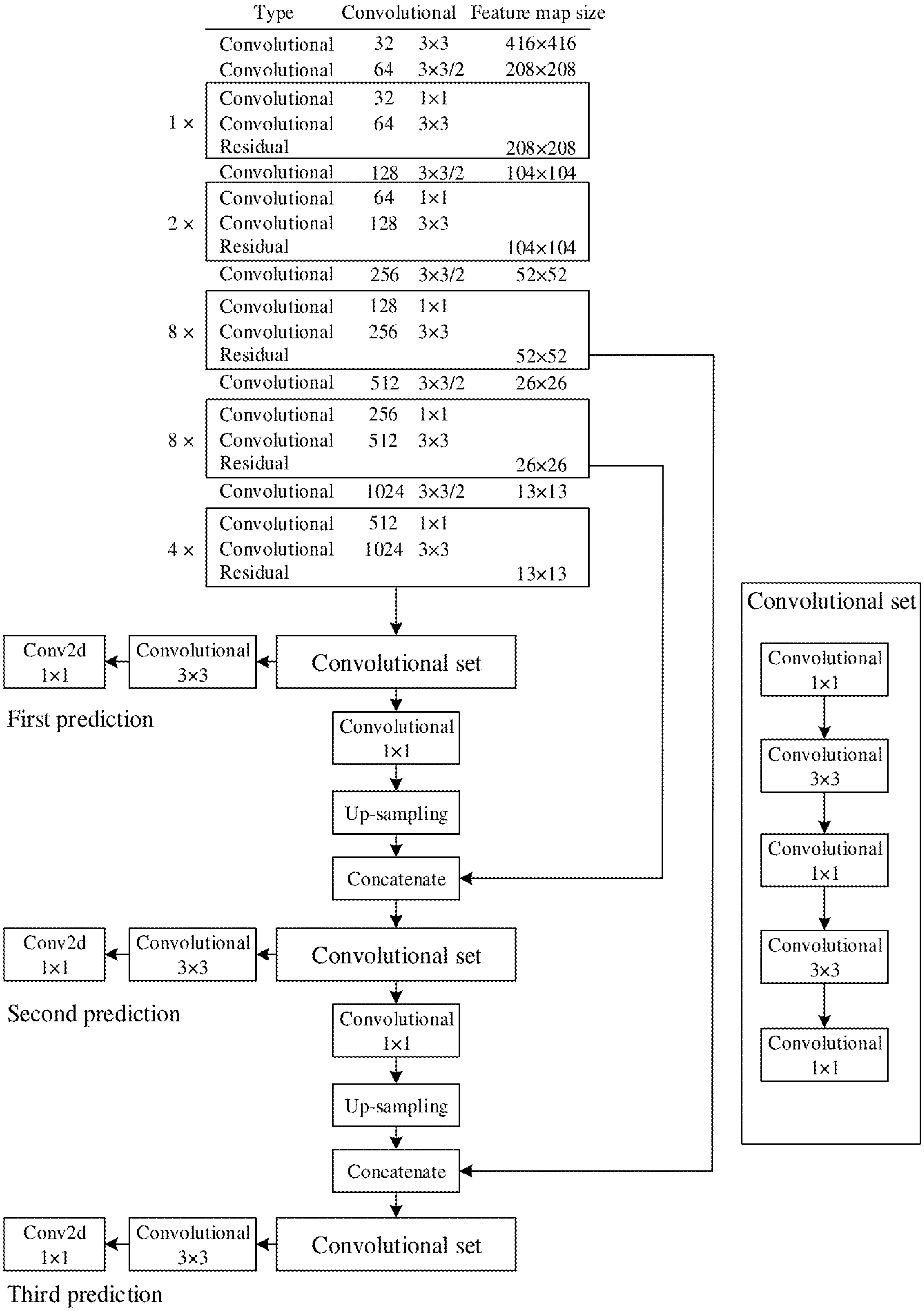
FIG. 13B is a structural schematic diagram of another yolo_v3 network model according to an embodiment of the present disclosure.
Figure 13C:
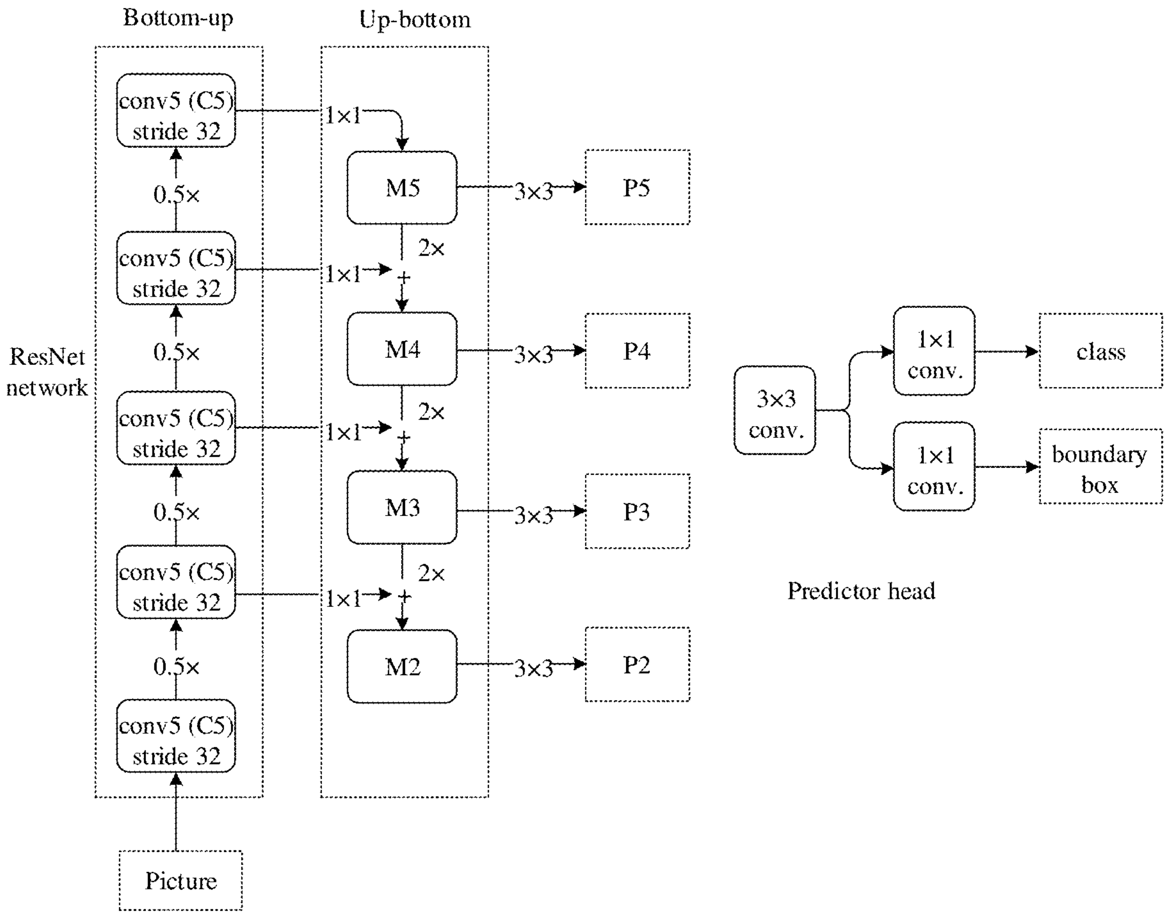
FIG. 13C is a structural schematic diagram of a ResNet-FPN network model according to an embodiment of the present disclosure.
Figure 13D:
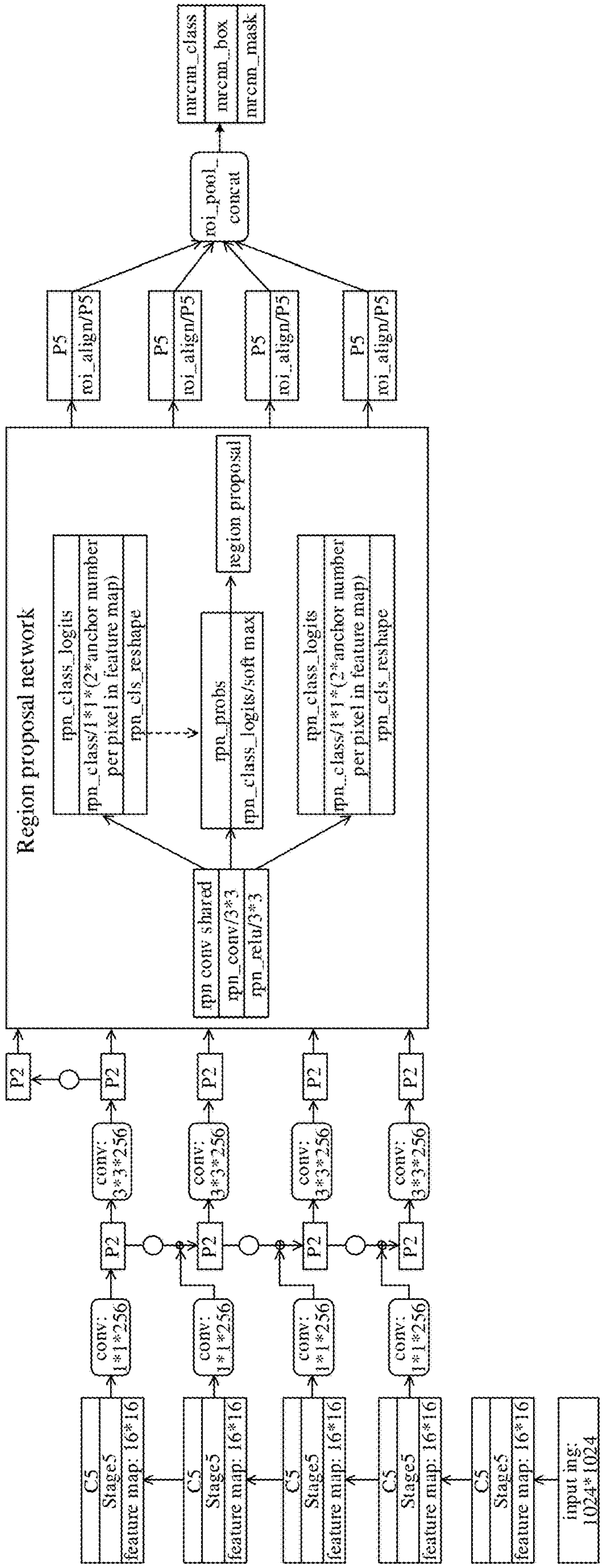
FIG. 13D is a structural schematic diagram of a Mask-RCNN network model according to an embodiment of the present disclosure.

Accordingly, in the field of intelligent task network, the target recognition network (you only look once_version3, yolo_v3) may be used for specific implementation, and the network model compositional structure is illustrated in FIG. 13A and FIG. 13B. In addition, the object detection network (Residual Networks-Feature Pyramid Networks, ResNet-FPN) and the instance segmentation network Mask Region-CNN (Mask-RCNN) may be used, the compositional structure of the object detection network model is illustrated in FIG. 13C and the compositional structure of the instance segmentation network model is illustrated in FIG. 13D.

As can be seen from the above, the feature space vector of the encoding and decoding network instead of the original picture is input into the intelligent task network, such that the process of picture restoration and extracting the restored picture feature may be saved, and the accuracy and speed of the intelligent task network may be better improved. Meanwhile, the feature extraction of intelligent task network is used as the input of the end-to-end picture encoding and decoding network, which may facilitate the encoding and decoding network to learn the picture information required by the intelligent task network better. In this way, in the embodiments of the disclosure, the feature extraction part of the intelligent task network is taken as the pre-processing flow of the end-to-end encoding network, and the analysis processing part of the intelligent task network is taken as the subsequent processing flow of the picture end-to-end decoding network, such that the decoding network can execute the processing of the intelligent task network without restoring to the picture dimension, thereby greatly reducing the complexity of the intelligent task network.

The present embodiment describes the specific implementation of the foregoing embodiments in detail. According to the technical solutions of the foregoing embodiments, it can be seen that not only the picture information required by the intelligent task network can be better learned, but also the complexity of the intelligent task network can be reduced, thereby improving the accuracy and speed of the intelligent task network.

Figure 14:
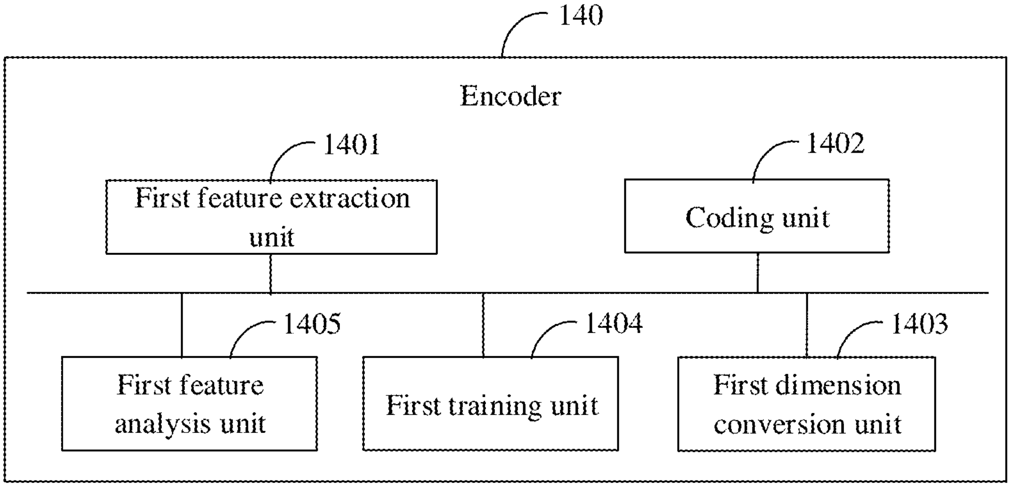
FIG. 14 is a schematic diagram of a composition structure of an encoder according to an embodiment of the present disclosure.

In an embodiment of the present disclosure, on the basis of the same inventive concept of the foregoing embodiments, referring to FIG. 14, FIG. 14 illustrates a schematic diagram of the compositional structure of an encoder 140 according to an embodiment of the present disclosure. As illustrated in FIG. 14, the encoder 140 may include: a first feature extraction unit 1401 and a coding unit 1402.

The first feature extraction unit 1401 is configured to perform the feature extraction for input picture data by using an intelligent task network to obtain initial feature data.

The coding unit 1402 is configured to perform the encoding process for the initial feature data by using an encoding network, and to signal the obtained encoded bits in a bitstream.

In some embodiments, the intelligent task network at least includes a feature extraction sub-network, and accordingly, the first feature extraction unit 1401 is specifically configured to perform feature extraction for the input picture data by using the feature extraction sub-network to obtain initial feature data at the first feature node.

In some embodiments, the feature extraction sub-network includes N feature extraction layers, where N is an integer greater than or equal to 1. Accordingly, the first feature extraction unit 1401 is further configured to: when N is equal to 1, perform feature extraction for the input picture data by using the feature extraction layer to obtain the initial feature data at the first feature node; and when N is greater than 1, perform feature extraction for the input picture data by using N feature extraction layers to obtain initial feature data at the first feature node.

In some embodiments, referring to FIG. 14, the encoder 140 may also include a first dimension conversion unit 1403.

The coding unit 1402 is further configured to: when a data dimension of a first encoding node in the encoding network matches with a data dimension of the first feature node, determine the initial feature data at the first feature node as to-be-encoded feature data at the first encoding node; or when the data dimension of the first encoding node in the encoding network does not match with the data dimension of the first feature node, perform data dimension conversion for the initial feature data at the first feature node by using an adaptation network through the first dimension conversion unit 1403, to obtain to-be-encoded feature data at the first encoding node.

In some embodiments, the coding unit 1402 is specifically configured to input the to-be-encoded feature data to the first encoding node of the encoding network, perform the encoding process for the to-be-encoded feature data by using the encoding network, and signal obtained encoded bits in a bitstream.

In some embodiments, the adaptation network includes a one-layer or multi-layer network structure.

In some embodiments, referring to FIG. 14, the encoder 140 may further include a first training unit 1404. The first training unit 1404 is configured to determine at least one training sample; and train the preset network model by using at least one training sample. Herein, the preset network model includes an initial encoding network, an initial decoding network and an initial intelligent task network, and the initial encoding network and the initial decoding network are connected with the initial intelligent task network through the node. When the loss function corresponding to the preset network model converges to the preset threshold value, the model obtained after training is determined as an intelligent fusion network model. The intelligent fusion network model includes an encoding network, a decoding network and an intelligent task network.

In some embodiments, the intelligent task network includes a feature extraction sub-network and a feature analysis sub-network. Referring to FIG. 14, the encoder 140 may also include a first feature analysis unit 1405.

The first feature extraction unit 1401 is further configured to perform feature extraction for the input picture data by using the feature extraction sub-network to obtain initial feature data.

The first feature analysis unit 1405 is configured to perform feature analysis for the initial feature data by using the feature analysis sub-network to determine the target result.

It is to be understood that in the embodiments of the present disclosure, the "unit" may be a part of a circuit, part of a processor, part of programs or softwares, etc., of course, it may also be modular or non-modular. Further, in the embodiments, various composition units may be integrated in one processing unit, or each unit may exist physically alone, or two or more units may be integrated in one unit. The above-mentioned integrated unit may be implemented either in the form of hardware or in the form of software function module.

When the integrated unit is implemented in the form of a software function module, and sold or used as an independent product, it may also be stored in a computer-readable storage medium. Based on such understanding, the technical solution of the present embodiments in essence or the part contributing to the related art or all or part of the technical solution may be embodied in the form of software product, and the computer software product is stored in a storage medium and includes several instructions for enabling a computer device (which can be a personal computer, a server, a network device, etc.) or processor to perform all or part of the steps of the method of the present embodiments. The aforementioned storage media include: U disk, mobile hard disk, read-only memory (ROM), random access memory (RAM), disk or optical disk and other media that can store program code.

Thus, the embodiments of the present disclosure provide a computer storage medium, applied to the encoder 140. The computer storage medium stores the computer program which, when implemented by the first processor, implements the method of any one of the preceding embodiments.

Figure 15:
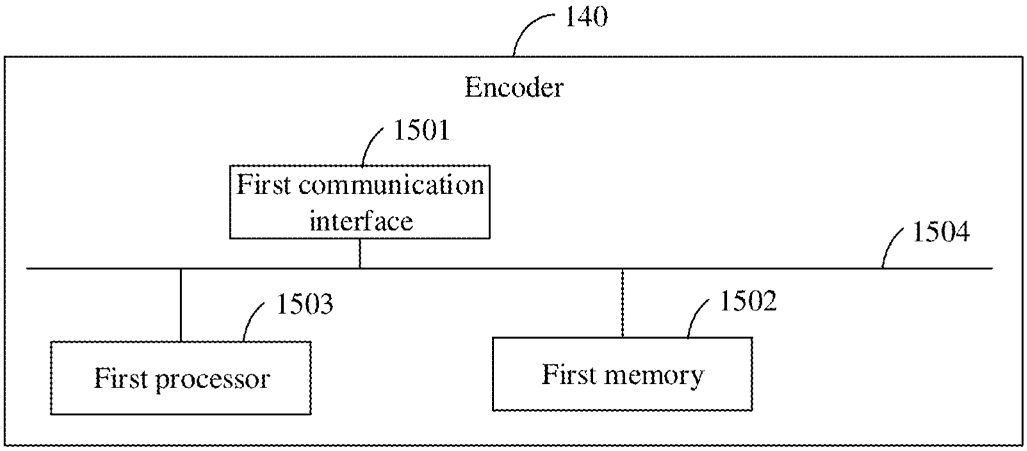
FIG. 15 is a structural schematic diagram of a specific hardware of an encoder according to an embodiment of the present disclosure.

Based on the above composition of the encoder 140 and the computer storage medium, referring to FIG. 15, FIG. 15 illustrates a structural schematic diagram of a specific hardware of an encoder 140 provided by an embodiment of the present disclosure. As illustrated in FIG. 15, the encoder 140 may include a first communication interface 1501, a first memory 1502 and a first processor 1503. The components are coupled together by a first bus system 1504. It is to be understood that the bus system 1504 is used to implement the connection communication between these components. In addition to a data bus, the first bus system 1504 further includes a power bus, a control bus and a status signal bus. However, the various buses are marked as the first bus system 1504 in FIG. 15 for clarity.

The first communication interface 1501 is configured to receive and transmit the signal in the process of transmitting and receiving information with other external network elements.

The first memory 1502 is configured to store a computer program capable of running on the first processor 1503.

The first processor 1503 is configured to, when running the computer program:

perform feature extraction for input picture data by using an intelligent task network to obtain initial feature data;

perform encoding process for the initial feature data by using an encoding network, and signal obtained encoded bits in a bitstream.

It is to be understood that the first memory 1502 in the embodiments of the present disclosure may be volatile memory or non-volatile memory, or may include both volatile and non-volatile memory. The non-volatile memory can be read-only memory (ROM), programmable ROM (PROM), erasable PROM (EPROM), electrically EPROM (EEPROM) or flash memory. Volatile memory can be random access memory (RAM), which is used as an external cache. By way of exemplary illustration, but not limitation, many forms of RAM are available, such as static RAM (SRAM), dynamic RAM (DRAM), synchronous DRAM (SDRAM), double data rate SDRAM (DDRSDRAM), enhanced SDRAM (ESDRAM), synchlink DRAM (SLDRAM) and direct Rambus RAM (DR RAM). The first memory 1502 of the systems and methods described herein is intended to include, but is not limited to, these and any other suitable types of memory.

The first processor 1503 may be an integrated circuit chip, which has signal processing capability. During the implementation, the various steps of the above method may be implemented by the integrated logic circuit of hardware in the first processor 1503 or instructions in the form of software. The above first processor 1503 may be general purpose processors, digital signal processors (DSPs), application specific integrated circuits (ASICs), field programmable gate arrays (FPGAs) or other programmable logic devices, discrete gate or transistor logic devices, and discrete hardware components. The disclosed methods, steps and logic block diagrams in the embodiments of the present disclosure can be implemented or executed. The general-purpose processor may be a microprocessor or the processor may be any conventional processor or the like. The steps of the method disclosed in connection with the embodiment of the present disclosure can be directly embodied in the execution completion of the hardware decoding processor, or by the combination of the hardware and software modules in the decoding processor. The software module can be located in random memory, flash memory, read-only memory, programmable read-only memory or electrically erasable programmable memory, register and other mature storage media in the art. The storage medium is located in the first memory 1502, and the first processor 1503 reads the information in the first memory 1502 and completes the steps of the above method in combination with its hardware.

It is to be understood that the embodiments described herein may be implemented in hardware, software, firmware, middleware, microcode or a combination thereof. For the hardware implementation, the processing unit may be implemented in one or more Application Specific Integrated Circuits (ASIC), Digital Signal Processors (DSP), Digital Signal Processing Devices (DSPD), Programmable Logic Devices (PLD), Field-Programmable Gate Arrays (FPGA), general purpose processors, controllers, microcontrollers, microprocessors, other electronic units for performing the functions described herein, or a combination thereof. For the software implementation, the techniques described herein may be implemented by modules (e.g. procedures, functions, etc.) that perform the functions described herein. The software code may be stored in the memory and executed by a processor. The memory may be implemented in the processor or outside the processor.

Alternatively, as another embodiment, the first processor 1503 is further configured to, when running the computer program, perform the method of any of the preceding embodiments.

The embodiments of the present disclosure provide an encoder. In the encoder, the feature extraction of the intelligent task network is used as the input of the encoding network, it not only can better learn the picture information required by the intelligent task network, but also can save the process of picture restoration and extracting the feature data for restoring picture in related arts, so that the decoding network can execute the process of the intelligent task network without restoring to the picture dimension, thereby greatly reducing the complexity of the intelligent task network, and further improving the accuracy and speed of the intelligent task network.

Figure 16:
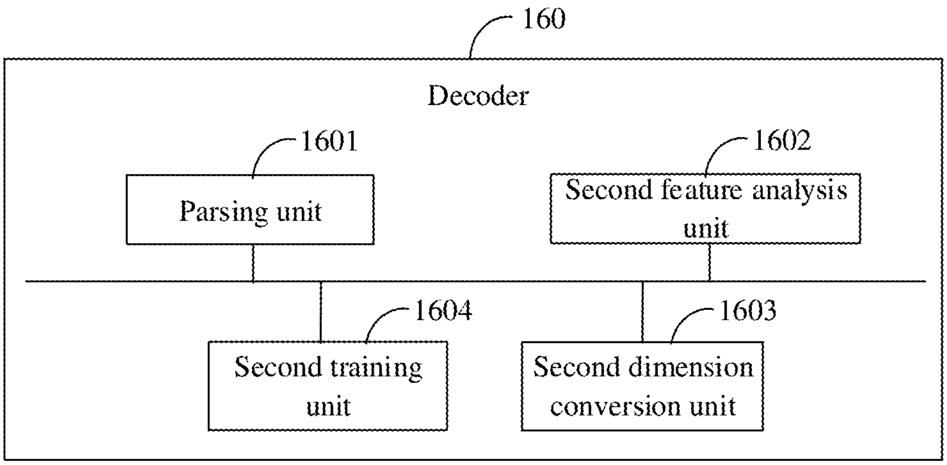
FIG. 16 is a schematic diagram of a composition structure of a decoder according to an embodiment of the present disclosure.

In another embodiment of the present disclosure, on the basis of the same inventive concept of the foregoing embodiments, referring to FIG. 16, FIG. 16 illustrates a schematic diagram of the compositional structure of a decoder 160 according to an embodiment of the present disclosure. As illustrated in FIG. 16, the decoder 160 may include: a parsing unit 1601 and a second feature analysis unit 1602.

The analysis unit 1601 is configured to parse the bitstream to determine the reconstruction feature data.

The second feature analysis unit 1602 is configured to perform feature analysis for the reconstruction feature data by using the intelligent task network to determine the target result.

In some embodiments, referring to FIG. 16, the decoder 160 may also include a second dimension conversion unit 1603.

The parsing unit 1601 is further configured to: parse the bitstream, and when a data dimension of a first feature node in the intelligent task network matches with a data dimension of the first reconstruction node, determine the candidate reconstruction feature data at the first reconstruction node as the reconstruction feature data; or parse the bitstream, and when the data dimension of the first feature node in the intelligent task network does not match with the data dimension of the first reconstruction node, perform data dimension conversion for the candidate reconstruction feature data at the first reconstruction node by using an adaptation network through the second dimension conversion unit 1603, to obtain the reconstruction feature data.

In some embodiments, the second feature analysis unit 1602 is specifically configured to input the reconstruction feature data to the first feature node in the intelligent task network, and perform feature analysis for the reconstruction feature data by using the intelligent task network to obtain the target result.

In some embodiments, the adaptation network includes a one-layer or multi-layer network structure.

In some embodiment, the intelligent task network includes a feature extraction sub-network and a feature analysis sub-network. Accordingly, the second feature analysis unit 1602 is specifically configured to: when the first feature node is a feature node obtained after passing through the feature extraction sub-network, input the reconstruction feature data to the first feature node, and perform feature analysis for the reconstruction feature data by using the feature analysis sub-network to obtain the target result.

In some embodiments, the feature analysis sub-network includes a region proposal network and a region of interest_heads. Accordingly, the second feature analysis unit 1602 is specifically configured to: process the reconstruction feature data by the region proposal network to obtain a target region; and perform intelligent analysis for the reconstruction feature data and the target region by the region of interest_heads to obtain the target result.

In some embodiments, the parsing unit 1601 is further configured to: parse the bitstream by using the decoding network to determine the reconstructed feature data.

In some embodiments, referring to FIG. 16, the decoder 160 may further include a second training unit 1604. The second training unit 1604 is configured to determine at least one training sample; and train the preset network model by using at least one training sample. Herein, the preset network model includes an initial encoding network, an initial decoding network and an initial intelligent task network, and the initial encoding network and the initial decoding network are connected with the initial intelligent task network through the node. When the loss function corresponding to the preset network model converges to the preset threshold value, the model obtained after training is determined as an intelligent fusion network model. The intelligent fusion network model includes an encoding network, a decoding network and an intelligent task network.

It is to be understood that in the embodiments, the "unit" may be a part of a circuit, part of a processor, part of programs or softwares, etc., of course, it may also be modular or non-modular. Further, in the embodiments, various composition units may be integrated in one processing unit, or each unit may exist physically alone, or two or more units may be integrated in one unit. The above-mentioned integrated unit may be implemented either in the form of hardware or in the form of software function module.

When the integrated unit is implemented in the form of a software function module, and sold or used as an independent product, it may also be stored in a computer-readable storage medium. Based on such understanding, the embodiments of the present disclosure provide a computer storage medium, applied to the decoder 160. The computer storage medium stores the computer program which, when implemented by the second processor, implements the method of any one of the preceding embodiments.

Figure 17:
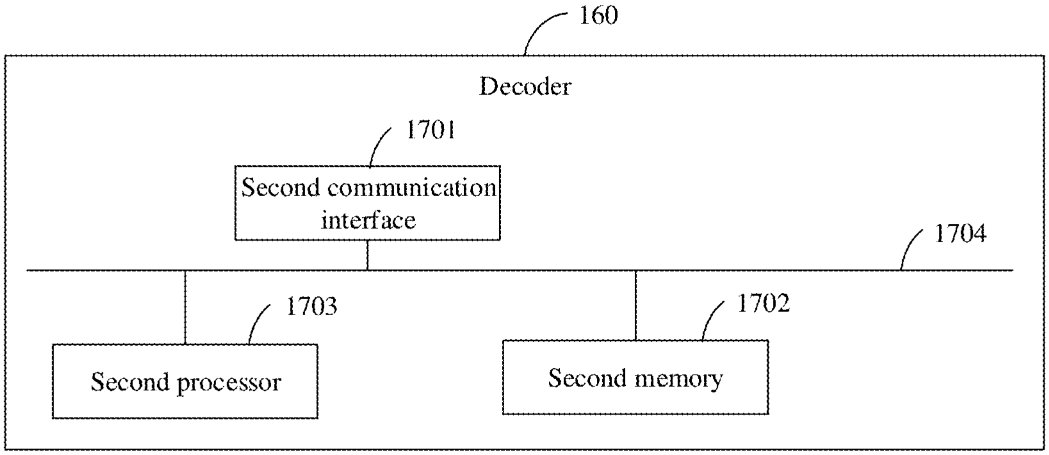
FIG. 17 is a structural schematic diagram of a specific hardware of a decoder according to an embodiment of the present disclosure.

Based on the above composition of the decoder 160 and the computer storage medium, referring to FIG. 17, FIG. 17 illustrates a structural schematic diagram of a specific hardware of a decoder 160 provided by an embodiment of the present disclosure. As illustrated in FIG. 17, the decoder 160 may include a second communication interface 1701, a second memory 1702 and a second processor 1703. The components are coupled together by a second bus system 1704. It is to be understood that the second bus system 1704 is used to implement the connection communication between these components. In addition to a data bus, the second bus system 1704 further includes a power bus, a control bus and a status signal bus. However, the various buses are marked as the second bus system 1704 in FIG. 17 for clarity.

The second communication interface 1701 is configured to receive and transmit the signal in the process of transmitting and receiving information with other external network elements.

The second memory 1702 is configured to store a computer program capable of running on the second processor 1703.

The second processor 1703 is configured to, when running the computer program:

- parse a bitstream to determine a reconstruction feature data; and
- perform feature analysis on the reconstruction feature data by using an intelligent task network to determine a target result.

Alternatively, as another embodiment, the second processor 1703 is further configured to, when running the computer program, perform the method of any of the preceding embodiments.

It is to be understood that the second memory 1702 is similar in hardware function to the first memory 1502, and the second processor 1703 is similar in hardware function to the first processor 1503, and will not be elaborated here.

The present embodiment provides a decoder. The decoder may include a parsing unit and a feature analysis unit. In this way, it not only can better learn the picture information required by the intelligent task network, but also can save the process of picture restoration and extracting the feature data for restoring picture in related arts, so that the decoding network can execute the process of the intelligent task network without restoring to the picture dimension, thereby greatly reducing the complexity of the intelligent task network, and further improving the accuracy and speed of the intelligent task network.

Figure 18:
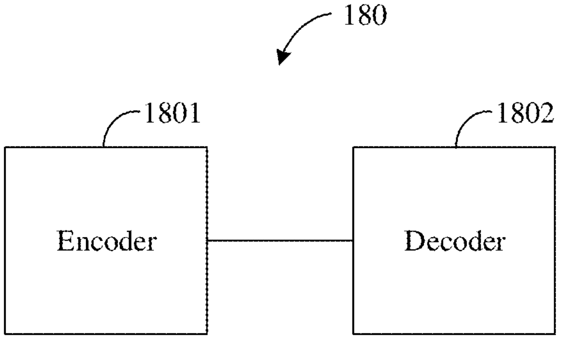
FIG. 18 is a schematic diagram of a composition structure of an intelligent analysis system according to an embodiment of the present disclosure.

In an embodiment of the present disclosure, referring to FIG. 18, FIG. 18 illustrates a schematic diagram of a composition structure of an intelligent analysis system according to an embodiment of the present disclosure. As illustrated in FIG. 18, the intelligent analysis system 180 may include an encoder 1801 and a decoder 1802. The encoder 1801 may be the encoder described in any one of the foregoing embodiments and the decoder 1802 may be the decoder described in any one of the foregoing embodiments.

In the embodiments of the present disclosure, the intelligent analysis system 180 includes an intelligent fusion network model, and the intelligent fusion network model may include an encoding network, a decoding network and an intelligent task network. The encoding network and part of the intelligent task network are used in the encoder 1801, and the decoding network and the other part of the intelligent task network are used in the decoder 1802. In this way, the feature extraction of the intelligent task network is used as the input of the encoding network, it not only can better learn the picture information required by the intelligent task network, but also can save the process of picture restoration and extracting the feature data for restoring picture in related arts, so that the decoding network can execute the process of the intelligent task network without restoring to the picture dimension, thereby greatly reducing the complexity of the intelligent task network, and further improving the accuracy and speed of the intelligent task network.

It is to be noted that the terms used herein "including", "comprising" or any other variation thereof are intended to encompass non-exclusive inclusion, so that a process, a method, an article or a device that includes a set of elements includes not only those elements but also other elements that are not explicitly listed, or also elements inherent to such a process, method, article or device. In the absence of further limitations, an element defined by the phrase "includes an . . . " does not exclude the existence of another identical element in the process, method, article or device in which the elements is included.

The above serial numbers of the embodiments of the present disclosure are for description only and do not represent the advantages and disadvantages of the embodiments.

The methods disclosed in several embodiments of the methods provided in the disclosure can be arbitrarily combined as long as there is no conflict therebetween to obtain a new embodiment of a method.

The features disclosed in several embodiments of the product provided in the disclosure can be arbitrarily combined as long as there is no conflict therebetween to obtain a new embodiment of a product.

The features disclosed in several embodiments of methods or devices provided in the disclosure can be arbitrarily combined as long as there is no conflict therebetween to obtain a new embodiment of a method or a device.

The descriptions above are only the specific embodiments of the present disclosure, and are not intended to limit the scope of protection of the embodiments of the present disclosure. Any change and replacement is easily to think within the technical scope of the embodiments of the present by those skilled in the art, and fall with the protection scope of the present disclosure. Therefore, the scope of protection of the embodiments of the present disclosure shall be subject to the scope of protection of the claims.

INDUSTRIAL PRACTICALITY

In the embodiments of the present disclosure, at the encoder side, the feature extraction for input picture data is performed by using an intelligent task network to obtain initial feature data, the encoding processing is performed for the initial feature data by using an encoding network, and the obtained encoded bits are signalled in a bitstream. At the decoder side, the bitstream is parsed to determine a reconstruction feature data, the feature analysis is performed on the reconstruction feature data by using an intelligent task network to determine a target result. In this way, the feature extraction of the intelligent task network is used as the input of the encoding network, it not only can better learn the picture information required by the intelligent task network, but also can save the process of picture restoration and extracting the feature data for restoring picture in related arts, so that the decoding network can execute the process of the intelligent task network without restoring to the picture dimension, thereby greatly reducing the complexity of the intelligent task network, and further improving the accuracy and speed of the intelligent task network.

The invention claimed is:

1. A decoding method, performed by a decoder, comprising:

parsing a bitstream to determine a reconstruction feature data; and performing a feature analysis on the reconstruction feature data by using an intelligent task network to determine a target result;

wherein parsing the bitstream to determine the reconstruction feature data comprises:

when a data dimension of a first feature node in the intelligent task network matches with a data dimension of a first reconstruction node, determining a candidate reconstruction feature data at the first reconstruction node as the reconstruction feature data; or when a data dimension of a first feature node in the intelligent task network does not match with a data dimension of a first reconstruction node, performing a data dimension conversion for a candidate reconstruction feature data at the first reconstruction node by using an adaptation network to obtain the reconstruction feature data.

2. The method of claim 1, wherein performing the feature analysis on the reconstruction feature data by using the intelligent task network to determine the target result comprises:

inputting the reconstruction feature data to the first feature node in the intelligent task network, and performing the feature analysis for the reconstruction feature data by using the intelligent task network to obtain the target result.

3. The method of claim 2, wherein the adaptation network comprises a one-layer or multi-layer network structure.

4. The method of claim 2, wherein the intelligent task network comprises a feature extraction sub-network and a feature analysis sub-network; and wherein performing the feature analysis on the reconstruction feature data by using the intelligent task network to determine the target result comprises:

when the first feature node is a feature node obtained after passing through the feature extraction sub-network, inputting the reconstruction feature data to the first feature node, and performing the feature analysis for the reconstruction feature data by using the feature analysis sub-network to obtain the target result.

5. The method of claim 4, wherein the feature analysis sub-network comprises a region proposal network and a region of interest heads; and wherein performing the feature analysis for the reconstruction feature data by using the feature analysis sub-network to obtain the target result comprises:

processing the reconstruction feature data through the region proposal network to obtain a target region; and performing an intelligent analysis for the reconstruction feature data and the target region through the region of interest heads to obtain the target result.

6. The method of claim 1, wherein parsing the bitstream to determine the reconstruction feature data further comprises: parsing the bitstream by using a decoding network to determine the reconstruction feature data.

7. The method of claim 6, wherein the method further comprises:

determining at least one training sample;

training a preset network model by using the at least one training sample; wherein the preset network model comprises an initial encoding network, an initial decoding network and an initial intelligent task network, and the initial encoding network and the initial decoding network are connected with the initial intelligent task network through a node; and when a loss function corresponding to the preset network model converges to a preset threshold value, determining a model obtained after training as an intelligent fusion network model; wherein the intelligent fusion network model comprises an encoding network, the decoding network and the intelligent task network.

8. An encoding method, performed by an encoder, comprising:

performing a feature extraction for input picture data by using an intelligent task network to obtain initial feature data;

performing an encoding process for the initial feature data by using an encoding network, and signalling obtained encoded bits in a bitstream;

wherein the intelligent task network at least comprises a feature extraction sub-network, and performing the feature extraction for the input picture data by using the intelligent task network to determine the initial feature data comprises:

performing the feature extraction for the input picture data by using the feature extraction sub-network to obtain the initial feature data at a first feature node;

wherein the method further comprises:

when a data dimension of a first encoding node in the encoding network matches with a data dimension of the first feature node, determining the initial feature data at the first feature node as to-be-encoded feature data at the first encoding node; or when a data dimension of a first encoding node in the encoding network does not match with a data dimension of the first feature node, performing a data dimension conversion for the initial feature data at the first feature node by using an adaptation network to obtain the to-be-encoded feature data at the first encoding node.

9. The method of claim 8, wherein the feature extraction sub-network comprises N feature extraction layers, N is an integer greater than or equal to 1; and wherein performing the feature extraction for the input picture data by using the feature extraction sub-network to obtain the initial feature data at the first feature node comprises:

when N is equal to 1, performing the feature extraction for the input picture data by using the feature extraction layer to obtain the initial feature data at the first feature node;

when N is greater than 1, performing the feature extraction for the input picture data by using the N feature extraction layers to obtain the initial feature data at the first feature node.

10. The method of claim 8, wherein performing the encoding process for the initial feature data by using the encoding network, and signalling the obtained encoded bits in the bitstream comprises:

inputting the to-be-encoded feature data to the first encoding node of the encoding network, performing the encoding process for the to-be-encoded feature data by using the encoding network, and signalling the obtained encoded bits in the bitstream.

11. The method of claim 8, wherein the adaptation network comprises a one-layer or multi-layer network structure.

12. The method of claim 8, further comprising:

determining at least one training sample;

training a preset network model by using the at least one training sample; wherein the preset network model comprises an initial encoding network, an initial decoding network and an initial intelligent task network, and the initial encoding network and the initial decoding network are connected with the initial intelligent task network through a node; and when a loss function corresponding to the preset network model converges to a preset threshold value, determining a model obtained after training as an intelligent fusion network model; wherein the intelligent fusion network model comprises the encoding network, a decoding network and the intelligent task network.

13. The method of claim 12, wherein the intelligent task network comprises a feature extraction sub-network and a feature analysis sub-network; and the method further comprises:

performing the feature extraction for the input picture data by using the feature extraction sub-network to obtain initial feature data;

performing a feature analysis for the initial feature data by using the feature analysis sub-network to determine a target result.

14. An decoder, comprising: a second memory and a second processor;

wherein the second memory is configured to store a computer program capable of running on the second processor; and the second processor is configured to, when running the computer program:

parse a bitstream to determine a reconstruction feature data; and perform a feature analysis on the reconstruction feature data by using an intelligent task network to determine a target result;

wherein the second processor is further configured to:

when a data dimension of a first feature node in the intelligent task network matches with a data dimension of a first reconstruction node, determine a candidate reconstruction feature data at the first reconstruction node as the reconstruction feature data; or when a data dimension of a first feature node in the intelligent task network does not match with a data dimension of a first reconstruction node, perform a data dimension conversion for a candidate reconstruction feature data at the first reconstruction node by using an adaptation network to obtain the reconstruction feature data.

15. The decoder of claim 14, wherein the second processor is further configured to:

input the reconstruction feature data to the first feature node in the intelligent task network, and perform the feature analysis for the reconstruction feature data by using the intelligent task network to obtain the target result.

16. The decoder of claim 15, wherein the intelligent task network comprises a feature extraction sub-network and a feature analysis sub-network; and wherein the second processor is further configured to:

when the first feature node is a feature node obtained after passing through the feature extraction sub-network, input the reconstruction feature data to the first feature node, and perform the feature analysis for the reconstruction feature data by using the feature analysis sub-network to obtain the target result.

17. The method of claim 1, wherein the data dimension of the first feature node in the intelligent task network matching with the data dimension of the first reconstruction node comprises:

when a number of feature space channels and a resolution at the first feature node are completely consistent with a number of feature space channels and a resolution at the first reconstruction node, determining that the data dimension of the first feature node in the intelligent task network matches with the data dimension of the first reconstruction node.

18. The method of claim 8, wherein the data dimension of the first encoding node in the encoding network matching with the data dimension of the first feature node comprises:

when a number of feature space channels and a resolution at the first feature node are completely consistent with a number of feature space channels and a resolution at the first encoding node, determining that the data dimension of the first encoding node in the encoding network matches with the data dimension of the first feature node.

19. The decoder of claim 14, wherein the data dimension of the first feature node in the intelligent task network matching with the data dimension of the first reconstruction node comprises:

when a number of feature space channels and a resolution at the first feature node are completely consistent with a number of feature space channels and a resolution at the first reconstruction node, determining that the data dimension of the first feature node in the intelligent task network matches with the data dimension of the first reconstruction node.

20. A non-transitory computer-readable medium having a computer program and a bitstream stored thereon, wherein the computer program, when executed by a first processor, enables the first processor to perform the steps of the encoding method of claim 8 to generate the bitstream.

* * * * *